US011032466B2

(12) United States Patent
Park et al.

(10) Patent No.: US 11,032,466 B2
(45) Date of Patent: *Jun. 8, 2021

(54) APPARATUS FOR EDITING IMAGE USING DEPTH MAP AND METHOD THEREOF

(71) Applicant: Samsung Electronics Co., Ltd., Suwon-si (KR)

(72) Inventors: Mi Ji Park, Seoul (KR); Tae Won Um, Seoul (KR); Jae Han Lee, Suwon-si (KR); Hwa Jun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,762

(22) Filed: Jun. 15, 2020

(65) Prior Publication Data
US 2020/0314328 A1 Oct. 1, 2020

Related U.S. Application Data

(63) Continuation of application No. 16/059,586, filed on Aug. 9, 2018, now Pat. No. 10,721,391.

(30) Foreign Application Priority Data

Aug. 18, 2017 (KR) ........................ 10-2017-0104774

(51) Int. Cl.
*H04N 5/222* (2006.01)
*H04N 5/232* (2006.01)
(Continued)

(52) U.S. Cl.
CPC ......... *H04N 5/23216* (2013.01); *G11B 27/00* (2013.01); *H04N 5/232939* (2018.08);
(Continued)

(58) Field of Classification Search
CPC ........ H04N 5/23216; H04N 5/232939; H04N 5/23293; H04N 5/232933; H04N 5/265;
(Continued)

(56) References Cited

U.S. PATENT DOCUMENTS 9,282,175 B2 3/2016 Choi
9,363,499 B2 6/2016 Wu et al.
(Continued)

FOREIGN PATENT DOCUMENTS

EP 2 574 061 A2 3/2013
EP 3 276 951 A1 1/2018
WO 2016/152633 A1 9/2016

OTHER PUBLICATIONS

Intenational Search Report dated Nov. 13, 2018 issued in International Application No. PCT/KR2018/009087.
(Continued)

*Primary Examiner* — Kelly L Jerabek
(74) *Attorney, Agent, or Firm* — Jefferson IP Law, LLP

(57) ABSTRACT

An electronic device is provided. The electronic device includes a display, a memory configured to store instructions, and a processor, wherein the processor is configured to execute the stored instructions to display an image and a user interface (UI) representing depth information of the image through the display in response to a first user input for editing the image, receive a second user input for selecting an object to be added in the image, display at least a part of the object in the image based on a depth value of the object and depth information of a first region in which the object is located in the image, and display an indicator representing the depth value of the object in the UI.

16 Claims, 21 Drawing Sheets

(51) Int. Cl.
  *H04N 5/262* (2006.01)
  *H04N 5/265* (2006.01)
  *G11B 27/00* (2006.01)
  *H04N 5/272* (2006.01)

(52) U.S. Cl.
  CPC ........... *H04N 5/265* (2013.01); *H04N 5/2621* (2013.01); *H04N 5/2628* (2013.01); *H04N 5/272* (2013.01)

(58) Field of Classification Search
  CPC .... H04N 5/272; H04N 5/2628; H04N 5/2621; G06T 7/11; G06T 7/194; G06T 2207/20221; G11B 27/00; G11B 27/34
  See application file for complete search history.

(56) References Cited

U.S. PATENT DOCUMENTS

| | | | |
|---|---|---|---|
| 9,420,172 | B2 | 8/2016 | Kim et al. |
| 9,445,084 | B2 | 9/2016 | Shikata et al. |
| 9,459,785 | B2 | 10/2016 | Kim |
| 9,791,922 | B2 | 10/2017 | Hakoda et al. |
| 9,860,510 | B2 | 1/2018 | Kerdok et al. |
| 10,600,169 | B2 | 3/2020 | Yamasaki et al. |
| 2012/0038625 | A1 | 2/2012 | Kim |
| 2012/0206574 | A1 | 8/2012 | Shikata et al. |
| 2012/0288184 | A1 | 11/2012 | Zomet |
| 2012/0306865 | A1 | 12/2012 | Kwon et al. |
| 2013/0063430 | A1 | 3/2013 | Kwon et al. |
| 2013/0069937 | A1 | 3/2013 | Kim |
| 2013/0165186 | A1 | 6/2013 | Choi |
| 2013/0293469 | A1 | 11/2013 | Hakoda et al. |
| 2014/0258867 | A1 | 9/2014 | Yang et al. |
| 2014/0267603 | A1 | 9/2014 | Kerdok et al. |
| 2014/0354848 | A1 | 12/2014 | Kim et al. |
| 2015/0139533 | A1 | 5/2015 | Wu et al. |
| 2015/0189154 | A1* | 7/2015 | Laroia ............... H04N 5/232125 348/345 |
| 2016/0054890 | A1 | 2/2016 | Kim |
| 2017/0201674 | A1* | 7/2017 | Yamamoto ............. H04N 5/262 |
| 2018/0075590 | A1 | 3/2018 | Yamasaki et al. |
| 2018/0109773 | A1 | 4/2018 | Kerdok et al. |
| 2018/0196221 | A1 | 7/2018 | Sun et al. |

OTHER PUBLICATIONS

Extended European Search Report dated Jun. 12, 2020, issued in European Patent Application No. 18846534.8.

\* cited by examiner

APPARATUS FOR EDITING IMAGE USING DEPTH MAP AND METHOD THEREOF

CROSS-REFERENCE TO RELATED APPLICATION(S)

This application is a continuation application of prior application Ser. No. 16/059,586, filed on Aug. 9, 2018, which application is based on and claims priority under 35 U.S.C. § 119(a) of a Korean patent application number 10-2017-0104774, filed on Aug. 18, 2017, in the Korean Intellectual Property Office, the disclosure of which is incorporated by reference herein its entirety.

BACKGROUND

1. Field

The disclosure relates to an apparatus for editing an image using a depth map and a method thereof.

2. Description of Related Art

An electronic device may obtain a color image and a depth map using at least one image sensor. The color image may include a red-green-blue (RGB) value of each pixel included therein and the depth map may include a depth value of each pixel. The depth value may be a value corresponding to a distance between a subject and an electronic device (or at least one image sensor). For example, when the depth values in one region including a plurality of pixels are greater than those in another region in a depth map, this may mean that the subject corresponding to the one region is closer to the electronic device than the subject in the other region.

The electronic device may provide various user interfaces (UI) to enable a user of the electronic device to edit an image. For example, the image editing may include image composition or inserting of an object (e.g., a sticker, a label, a drawing, or the like) in an image.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for editing an image using a depth map and a method thereof.

Another aspect of the disclosure is to provide an electronic device may provide a UI for editing an image to a user, but does not provide a function of editing an image using a depth map.

Additional aspects will be set forth in part in the description which follows and, in part, will be apparent from the description, or may be learned by practice of the presented embodiments.

In accordance with an aspect of the disclosure, an electronic device is provided. The electronic device includes a display, a memory configured to store instructions, and a processor coupled to the display and the memory, wherein the processor is configured to execute the stored instructions to display an image and a user interface (UI) representing depth information of the image through the display in response to a first user input for editing the image, receive a second user input for selecting an object to be added in the image, display at least a part of the object in the image based on a depth value of the object and depth information of a first region in which the object is located in the image, and display an indicator representing the depth value of the object in the UI.

In accordance with another aspect of the disclosure, a method of an electronic device is provided. The method includes displaying an image and a UI representing depth information of the image in response to a first user input for editing the image, receiving a second user input for selecting an object to be added in the image, displaying at least a part of the object in the image based on a depth value of the object and depth information of a first region in which the object is located in the image, and displaying an indicator representing the depth value of the object in the UI.

In accordance with an aspect of the disclosure, an electronic device is provided. The electronic device includes at least one image sensor, a display, a memory configured to store instructions, and a processor, wherein the processor is configured to execute the stored instructions to obtain a color image and a depth map corresponding to the color image through the at least one image sensor, generate an image by combining the color image with the depth map, display the image and a UI representing depth information of the image through the display in response to a first user input for editing the image, receive a second user input for selecting an object to be added in the image, display at least a part of the object in the image based on a depth value of the object and depth information of a first region in which the object is located in the image, and display an indicator representing the depth value of the object in the UI.

According to the embodiments of the disclosure, the electronic device may provide a function of editing an image using an UI showing depth information of an image.

According to the embodiments of the disclosure, the electronic device may provide a function of displaying an object of which a depth value is changed in response to reception of various user inputs.

In addition, various effects that are directly or indirectly understood through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
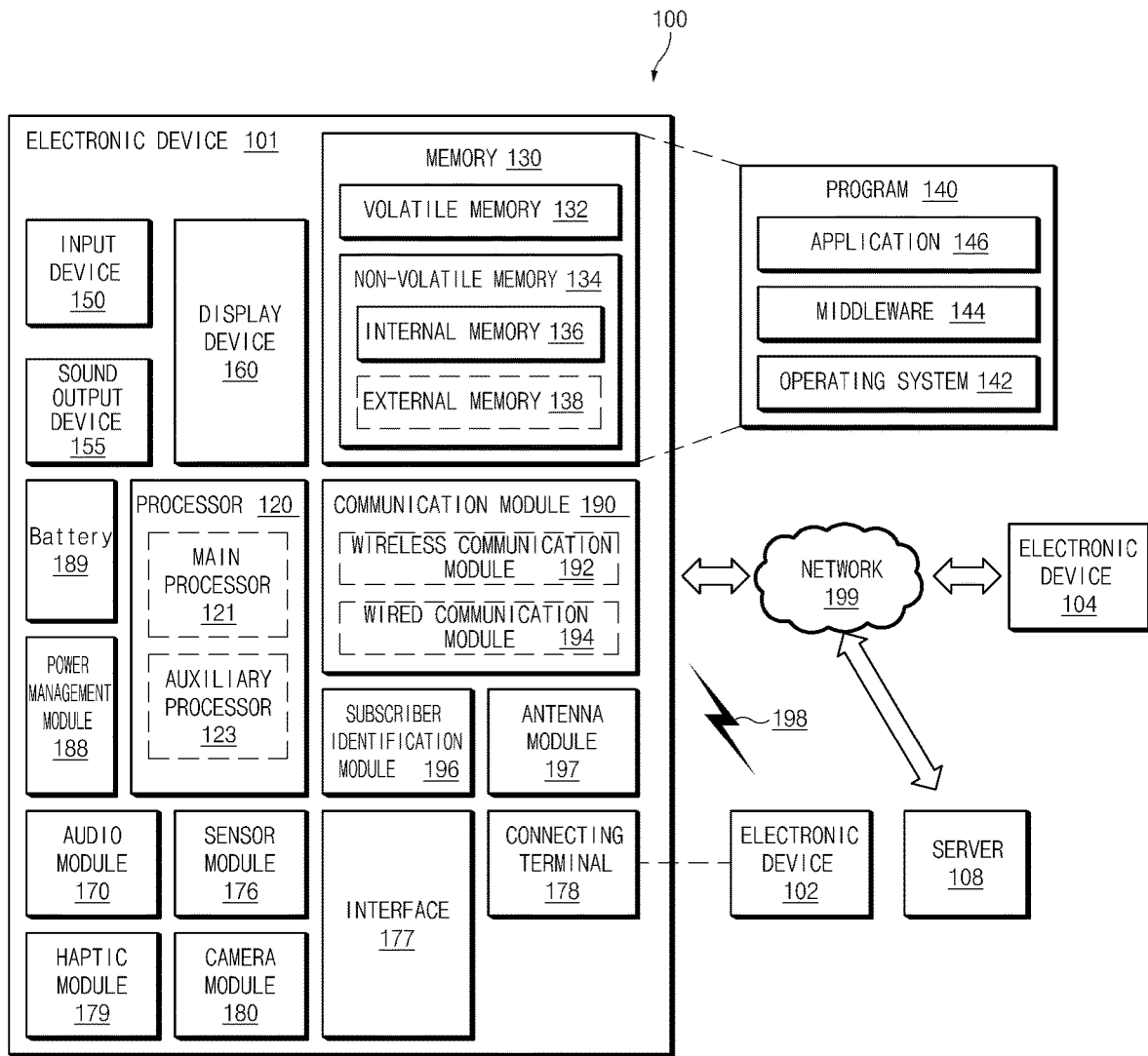
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, a first electronic device 101 may communicate with a second electronic device 102 through a first network 198 (e.g., a short-range wireless communication) or may communicate with a third electronic device 104 or a server 108 through a second network 199 (e.g., a long-distance wireless communication) in a network environment 100. According to an embodiment of the disclosure, the first electronic device 101 may communicate with the third electronic device 104 through the server 108. According to an embodiment of the disclosure, the first electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments of the disclosure, at least one (e.g., the display device 160 or the camera module 180) among components of the first electronic device 101 may be omitted or other components may be added to the first electronic device 101. According to some embodiments of the disclosure, some components may be integrated and implemented as in the case of the sensor module 176 (e.g., a fingerprint sensor, an iris sensor, or an illuminance sensor) embedded in the display device 160 (e.g., a display or a display unit).

The processor 120 may operate, for example, software (e.g., a program 140) to control at least one of other components (e.g., a hardware or software component) of the first electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to an embodiment of the disclosure, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121, additionally or alternatively uses less power than the main processor 121, or is specified to a designated function. In this case, the auxiliary processor 123 may operate separately from the main processor 121 or embedded.

The auxiliary processor 123 may control, for example, at least some of functions or states associated with at least one component (e.g., the display device 160, the sensor module 176, or the communication module 190) among the components of the first electronic device 101 instead of the main processor 121 while the main processor 121 is in an inactive (e.g., sleep) state or together with the main processor 121 while the main processor 121 is in an active (e.g., an application execution) state. According to an embodiment of the disclosure, the auxiliary processor 123 (e.g., the image signal processor or the communication processor) may be implemented as a part of another component (e.g., the camera module 180 or the communication module 190) that is functionally related to the auxiliary processor 123. The memory 130 may store a variety of data used by at least one component (e.g., the processor 120 or the sensor module 176) of the first electronic device 101, for example, software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may be a device for receiving a command or data, which is used for a component (e.g., the processor 120) of the first electronic device 101, from an outside (e.g., a user) of the first electronic device 101 and may include, for example, a microphone, a mouse, or a keyboard.

The sound output device 155 may be a device for outputting a sound signal to the outside of the first electronic device 101 and may include, for example, a speaker used for general purposes, such as multimedia play or recordings play, and a receiver used only for receiving calls. According to an embodiment of the disclosure, the receiver and the speaker may be either integrally or separately implemented.

The display device 160 may be a device for visually presenting information to the user and may include, for example, a display, a hologram device, or a projector and a control circuit for controlling a corresponding device. According to an embodiment of the disclosure, the display device 160 may include a touch circuitry or a pressure sensor for measuring an intensity of pressure on the touch.

According to various embodiments of the disclosure, when the display device 160 includes a touch circuit or a pressure sensor, the display device 160 may receive various types of user inputs. According to an embodiment of the disclosure, a user input may include an input using at least one body (e.g., a finger) of a user. For example, the input using at least one body of a user may include an operation of touching a touch screen at least once (which may be referred to as a tap operation), an operation of touching a touch screen by at least one body of a user for a predetermined time period (which may be referred to as a touch-and-hold or press operation), an operation of touching a touch screen by at least one body of a user at a predetermined pressure or higher (which may be referred to as a pressure touch operation), an operation of moving at least one body of a user without restriction in time and direction while the at least one body touches a touch screen (which may be referred to as a panning operation), an operation of moving at least one body of a user without restriction in time and direction while the at least one body touches a touch screen (which may be referred to as a panning operation), an operation of moving at least one body of a user faster than a swipe operation (which may be referred to as a flick operation), an operation of moving at least one body of a user while the at least one body touches an object displayed on a touch screen (which may be referred to as a drag operation), an operation of narrowing or widening an interval between at least two or more bodies of a user while the at least two or more bodies touch the touch screen (which may be referred to as a pinch-in or pinch-out operation), an operation of rotating at least one body of a user while the at least one body touches a touch screen (which may be referred to as a rotating operation), and combinations thereof. According to another embodiment of the disclosure, a user input may include an input using an external device. For example, the external device may include an electronic pen (which may be referred to as a touch pen). For example, the input using an external device may include a tap operation, a press operation, a pressure touch operation, a hovering operation, a panning operation, a swipe operation, a flick operation, a drag operation, a rotating operation, a button input operation (which may include, for example, a scheme of pushing a button included in an electronic pen in a touch or hovering state), and combinations thereof.

The audio module 170 may convert a sound and an electrical signal in dual directions. According to an embodiment of the disclosure, the audio module 170 may obtain the sound through the input device 150 or may output the sound through an external electronic device (e.g., the second electronic device 102 (e.g., a speaker or a headphone)) wired or wirelessly connected to the sound output device 155 or the first electronic device 101.

The sensor module 176 may generate an electrical signal or a data value corresponding to an operating state (e.g., power or temperature) inside or an environmental state outside the first electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device (e.g., the second electronic device 102). According to an embodiment of the disclosure, the interface 177 may include, for example, a high-definition multimedia interface (HDMI), a universal serial bus (USB) interface, a secure digital (SD) card interface, or an audio interface.

A connection terminal 178 may include a connector that physically connects the first electronic device 101 to the external electronic device (e.g., the second electronic device 102), for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to an embodiment of the disclosure, the camera module 180 may include, for example, at least one lens, an image sensor, an image signal processor, or a flash.

The power management module 188 may be a module for managing power supplied to the first electronic device 101 and may serve as at least a part of a power management integrated circuit (PMIC).

The battery 189 may be a device for supplying power to at least one component of the first electronic device 101 and may include, for example, a non-rechargeable (primary) battery, a rechargeable (secondary) battery, or a fuel cell.

The communication module 190 may establish a wired or wireless communication channel between the first electronic device 101 and the external electronic device (e.g., the second electronic device 102, the third electronic device 104, or the server 108) and support communication execution through the established communication channel. The communication module 190 may include at least one communication processor operating independently from the processor 120 (e.g., the application processor) and supporting the wired communication or the wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., an local area network (LAN) communication module or a power line communication module) and may communicate with the external electronic device using a corresponding communication module among them through the first network 198 (e.g., the short-range communication network, such as a Bluetooth, a WiFi direct, or an infrared data association (IrDA)) or the second network 199 (e.g., the long-distance wireless communication network, such as a cellular network, an internet, or a computer network (e.g., LAN or wide area network (WAN)). The above-mentioned various communication modules 190 may be implemented into one chip or into separate chips, respectively.

According to an embodiment of the disclosure, the wireless communication module 192 may identify and authenticate the first electronic device 101 using user information stored in the subscriber identification module 196 in the communication network.

The antenna module 197 may include one or more antennas to transmit or receive the signal or power to or from an external source. According to an embodiment of the disclosure, the communication module 190 (e.g., the wireless communication module 192) may transmit or receive the signal to or from the external electronic device through the antenna suitable for the communication method.

Some components among the components may be connected to each other through a communication method (e.g., a bus, a general purpose input/output (GPIO), a serial peripheral interface (SPI), or a mobile industry processor interface (MIPI)) used between peripheral devices to exchange signals (e.g., a command or data) with each other.

According to an embodiment of the disclosure, the command or data may be transmitted or received between the first electronic device 101 and the external third electronic device 104 through the server 108 connected to the second network 199. Each of the second electronic device 102 and the third electronic device 104 may be the same or different types as or from the first electronic device 101. According to an embodiment of the disclosure, all or some of the operations performed by the first electronic device 101 may be performed by another electronic device or a plurality of external electronic devices. When the first electronic device 101 performs some functions or services automatically or by request, the first electronic device 101 may request the external electronic device to perform at least some of the functions related to the functions or services, in addition to or instead of performing the functions or services by itself. The external electronic device receiving the request may carry out the requested function or the additional function and transmit the result to the first electronic device 101. The first electronic device 101 may provide the requested functions or services based on the received result as is or after additionally processing the received result. To this end, for example, a cloud computing, distributed computing, or client-server computing technology may be used.

Figure 2:
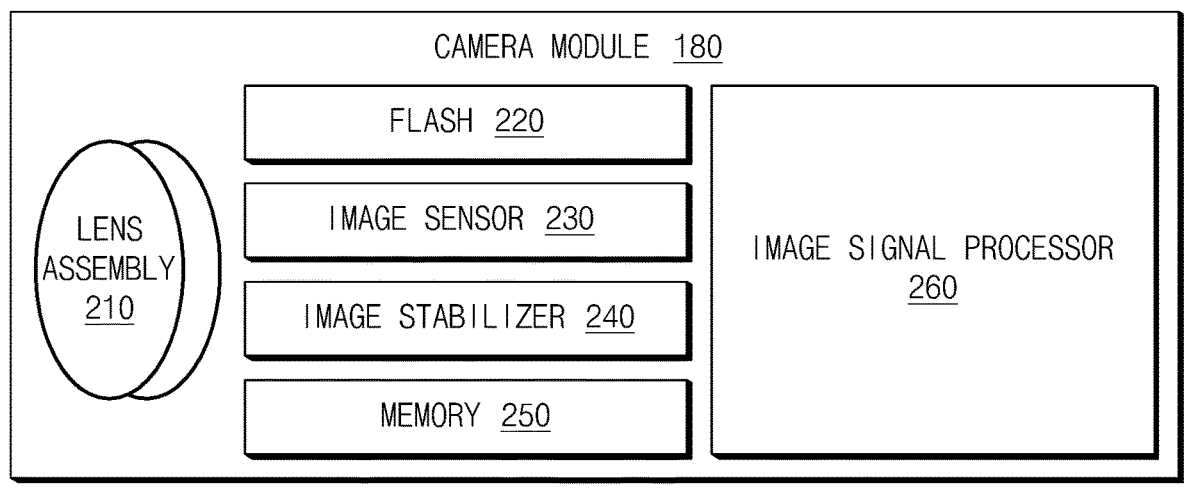
FIG. 2 is a block diagram illustrating a camera module according to an embodiment of the disclosure.

FIG. 2 is a block diagram illustrating a camera module according to an embodiment of the disclosure.

Referring to FIG. 2, the camera module 180 may include a lens assembly 210, a flash 220, an image sensor 230, an image stabilizer 240, a memory (e.g., a buffer memory) 250, or an image signal processor 260. The lens assembly 210 may collect light emitted from a subject which is an object of image capturing. The lens assembly 210 may include one or more lenses. According to an embodiment of the disclosure, the camera module 180 may include a plurality of lens assemblies 210. In this case, the camera module 180 may be, for example, a dual camera, a 360-degree camera, or a spherical camera. The plurality of lens assemblies 210 may have the same lens properties (e.g., angle of view, focal length, autofocus, f number, or optical zoom), or at least one lens assembly may have a property different from that of another lens assembly. For example, the lens assembly 210 may include a wide-angle lens or a telephoto lens. The flash 220 may emit a light source used to enhance the light emitted from the subject. The flash 220 may include one or more light emitting diodes (e.g., RGB light emitting diode (LED), a white LED, an infrared LED, or an ultraviolet LED), or a xenon lamp.

The image sensor 230 may acquire an image corresponding to the subject by converting the light transmitted from the subject through the lens assembly 210 into an electrical signal. According to an embodiment of the disclosure, the image sensor 230 may include, for example, one selected from image sensors having different properties, such as an RGB sensor, a black and white (BW) sensor, an IR sensor, or a UV sensor, a plurality of image sensors having the same property, or a plurality of image sensors having different properties. For example, each image sensor included in the image sensor 230 may be implemented with a charged coupled device (CCD) sensor or a complementary metal oxide semiconductor (CMOS) sensor. According to an embodiment of the disclosure, when the camera module 180 includes the plurality of lens assemblies 210, the image sensor 230 includes a plurality of image sensors that acquire images from each of the plurality of lens assemblies 210. For example, one of the image sensors may acquire a color image and another image sensor may acquire a depth map (which may be referred to as a depth map image). As another example, each of the plurality of image sensors may cooperate with each another to obtain a color image and a depth map.

The image stabilizer 240 may move or control (e.g., adjustment of read-out timing, and the like) at least one lens included in the lens assembly 210 or the image sensor 230 in a specific direction to at least partially compensate for a negative effect (e.g., image blurring) due to movement of the camera module 180 or the first electronic device 101 including the camera module 180 with respect to the image being photographed in response to the movement of the camera module 180 or the first electronic device 101. According to an embodiment of the disclosure, the image stabilizer 240 may be implemented, for example, with an optical image stabilizer and may detect the movement by using a gyro sensor (not shown) or an acceleration sensor (not shown) located inside or outside the camera module 180.

The memory 250 may at least temporarily store at least a part of the image obtained through the image sensor 230 for a next image processing operation. For example, when image acquisition by the shutter is delayed or a plurality of images are acquired at a high speed, the acquired original image (e.g., a high-resolution image) is stored in the memory 250, and a copy image (e.g., a low-resolution image) corresponding to the original image may be previewed through the display device 160. Then, when a specified condition (e.g., a user input or system instruction) is met, at least a part of the original image stored in the memory 250 may be obtained and processed, for example, by the image signal processor 260. According to an embodiment of the disclosure, the memory 250 may be implemented with at least a part of the memory 130 or a separate memory operated independent of the memory 130.

The image signal processor 260 may perform image processing (e.g., depth map generation, three-dimensional modeling, panorama generation, feature point extraction, image composition, or image compensation (e.g., noise reduction, resolution adjustment, brightness adjustment, blurring, sharpening, or softening)) of an image acquired through the image sensor 230 or an image stored in the memory 250. Additionally or alternatively, the image signal processor 260 may perform control (e.g., exposure time control, lead-out timing control, or the like) of at least one of the components (e.g., the image sensor 230) included in the camera module 180. The image processed by the image signal processor 260 may be again stored in the memory 250 for additional processing or may be transmitted to an external component of the camera module 180 (e.g., the memory 130, the display device 160, the second electronic device 102, the third electronic device 104, or server 108). According to an embodiment of the disclosure, the image signal processor 260 may be configured as at least a part of the processor 120, or may be configured as a separate processor operating independently of the processor 120. When the image signal processor 260 is configured as a separate processor, the images processed by the image signal processor 260 may be displayed by the processor 120 through the display device 160 as they are or after being additionally image-processed.

According to an embodiment of the disclosure, the first electronic device 101 may include two or more camera modules 180 having different properties or functions. In this case, for example, the at least one camera module 180 may be a wide-angle camera or a front camera and at least one other camera module may be a telephoto camera or a rear camera.

In the drawings described below, each operation may be implemented by an electronic device (e.g., the first electronic device 101), or a processor (e.g., the processor 120 or the image signal processor 260) included in the electronic device. When each operation is implemented by the processor, the processor may perform each operation by executing instructions stored in the memory (e.g., the memory 130 or the memory 250) of the electronic device.

Figure 3:
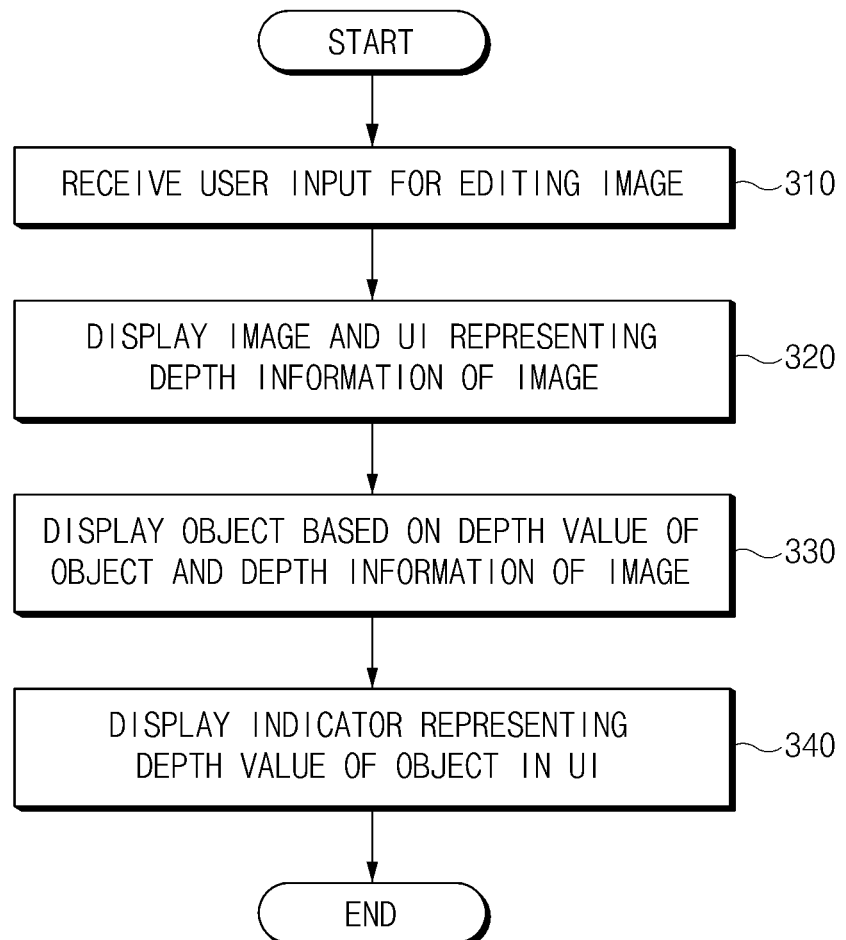
FIG. 3 is a flowchart illustrating an operation of an electronic device for editing an image using a UI showing depth information of an image according to an embodiment of the disclosure of the disclosure.

FIG. 3 is a flowchart illustrating an operation of an electronic device for editing an image using a UI showing depth information of an image according to an embodiment of the disclosure.

Referring to FIG. 3, in operation 310, the electronic device (e.g., the first electronic device 101) and the processor 120 or the image signal processor 260 may receive a user input for editing an image. For example, the electronic device may receive the user input for editing an image while displaying the image. As another example, the electronic device may receive a user input for editing one of a plurality of images while displaying thumbnails of the images.

In operation 320, the electronic device may display a UI representing an image and depth information of the image in response to the reception of the user input for editing an image. The relationship of the UI representing an image, a depth map and depth information will be described in FIG. 5.

Figure 5:
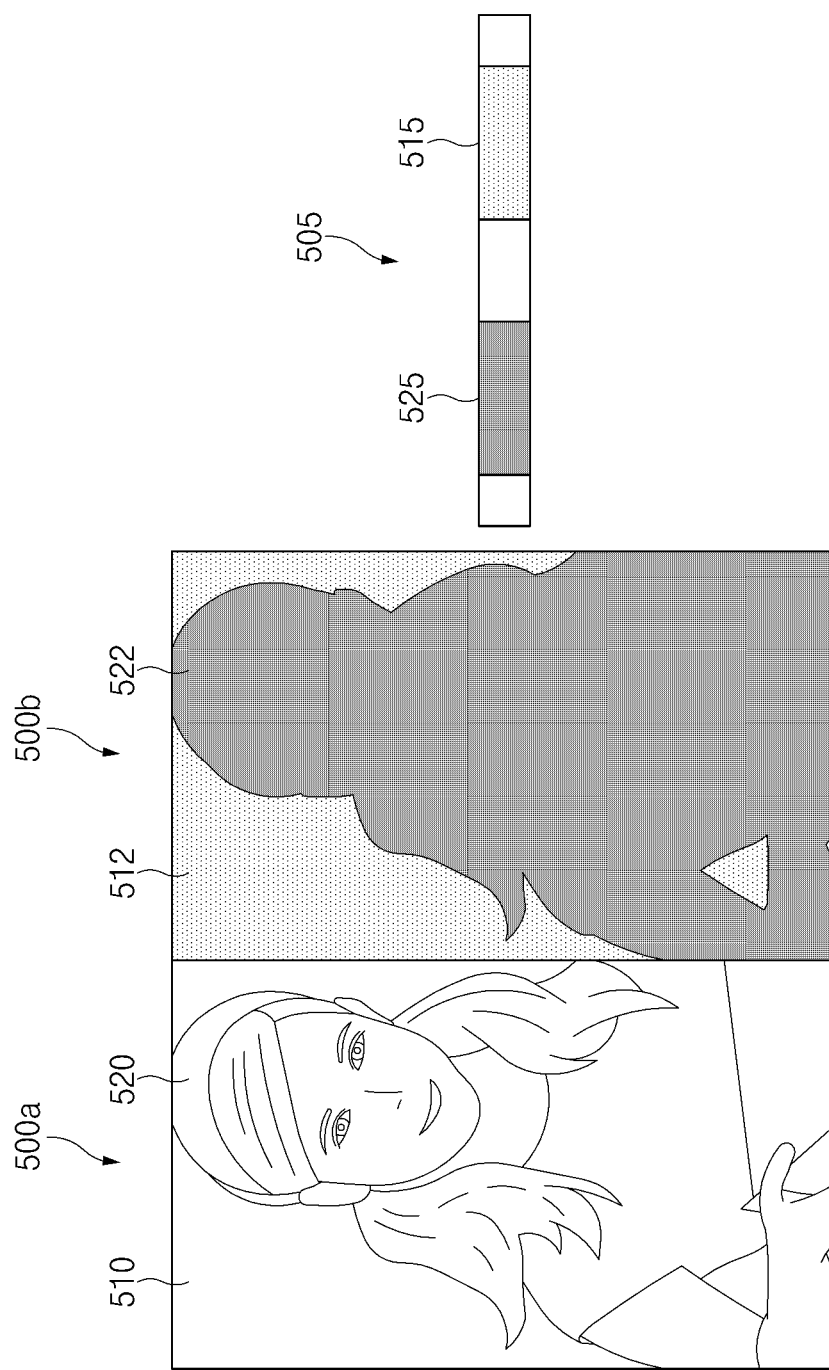
FIG. 5 is a view illustrating a UI showing depth information of an image according to an embodiment of the disclosure.

FIG. 5 is a view illustrating a UI showing depth information of an image according to an embodiment of the disclosure.

Referring to FIG. 5, the electronic device may obtain a color image 500a and a depth map 500b through at least one image sensor. The color image 500a may include color information (e.g., RGB values) of each pixel. The electronic device may display a background subject 510 and a foreground subject 520 by using the color information of each pixel included in the color image 500a. The depth map 500b may include depth values of each pixel. For example, when the electronic device supports a memory capacity of 1 byte per pixel, the depth value may be expressed as a value from 0 to 255. According to an embodiment of the disclosure, the electronic device may be set such that the closer the distance between the electronic device and the subject is, the greater the depth value is, or the closer the distance between the electronic device and the subject is, the less the depth value is. Various embodiments of the disclosure described below describe an example in which the depth value is increased as the distance between the electronic device and the subject is closer. According to an embodiment of the disclosure, the depth values of pixels may be different from each other, but the depth values of the plurality of pixels constituting a part of an image region may be the same or similar to each other. For example, the depth values of the pixels constituting the foreground subject 520 in the color image 500a may be the same or similar to each other, and the depth values of the pixels constituting the background subject 510 may be the same or similar to each other. In this case, the pixels constituting an image region 512 (i.e., the region corresponding to the background subject 510) in the depth map 500b may be represented at the same or similar brightness, and an image region 522 (i.e., the region corresponding to the foreground subject 520) may be represented at the same or similar brightness.

According to an embodiment of the disclosure, the electronic device may generate a UI 505 representing the depth information of the image based on the depth map 500b. In various embodiments of the disclosure, an image may refer to an image generated by combining a color image and a depth map. In various embodiments of the disclosure, the depth information may include a depth value distribution of pixels.

FIG. 5 illustrates a horizontal bar graph type of UI 505, but the type of UI 505 is not limited to that shown in FIG. 5, and may vary depending on the implementation scheme. For example, the UI 505 may be a vertical bar graph. According to an embodiment of the disclosure, the horizontal axis of the UI 505 may correspond to a depth value range (e.g., from 0 to 255) of the depth map 500b, or may correspond to a value obtained by converting the depth value range into the range of 0 to 100. According to an embodiment of the disclosure, the UI 505 may represent depth information of at least a region in the depth map 500b. For example, the depth values of the pixels corresponding to the image region 522 in the depth map 500b may be distributed in a specific range, so that the electronic device may display a depth range 525 representing the depth information of the image region 522 in the UI 505. In the same principle, the electronic device may display a depth range 515 that represents the depth information of the image region 512 in the UI 505.

Referring back to FIG. 3, in operation 330, the electronic device may display at least a part of the object in the image based on the depth value of the object being added in the image and the depth information of the image. For example, the object may include a sticker, a label, a drawing, a memo, an image, a mosaic, or calligraphy. According to an embodiment of the disclosure, the electronic device may display at least a part of the object in the image by comparing the depth value of the object with the depth information of the region (which may be referred to as a first region) in which the object is displayed in the image. For example, referring to FIG. 5, the object may be inserted at a location at which a part of the background subject 510 overlaps a part of the foreground subject 520. The electronic device may compare the depth value of the object, the depth information of the image region 512 and the depth information of the image region 522 with one another. When the depth value of the object is greater than the maximum depth value of the image region 522, the electronic device may display the entire object in the image. In this case, the object may be seen to the user as being arranged forward in the image. When the depth value of the object is less than the minimum depth value of the image region 512, the electronic device may not display the object in the image. When the depth value of the object is less than the minimum depth value of the image region 522 and greater than the maximum depth value of the image region 512, the electronic device may display only a part of the object that overlaps the image region 512. In this case, the object may be arranged behind the foreground subject 520 in the image, and may be seen to the user as being arranged in front of the background subject 510.

In operation 340, the electronic device may display, in the UI, an indicator that indicates the depth value of the object. According to an embodiment of the disclosure, the electronic device may display the indicator in response to receiving a user input for selecting an object. The indicator may be displayed in the UI based on the relationship between the depth value of the object and the depth information of the image determined in operation 330. For example, based on whether the depth value of the object is greater than the depth value of each of the pixels corresponding to the first region, the indicator may be arranged left (or top) or right (or bottom) in the UI.

The electronic device may provide a function of adjusting the depth of an object in the image by displaying a UI representing the depth value of the object and the depth information of the image. A specific embodiment for adjusting the depth of an object will be described in FIG. 4.

Figure 4:
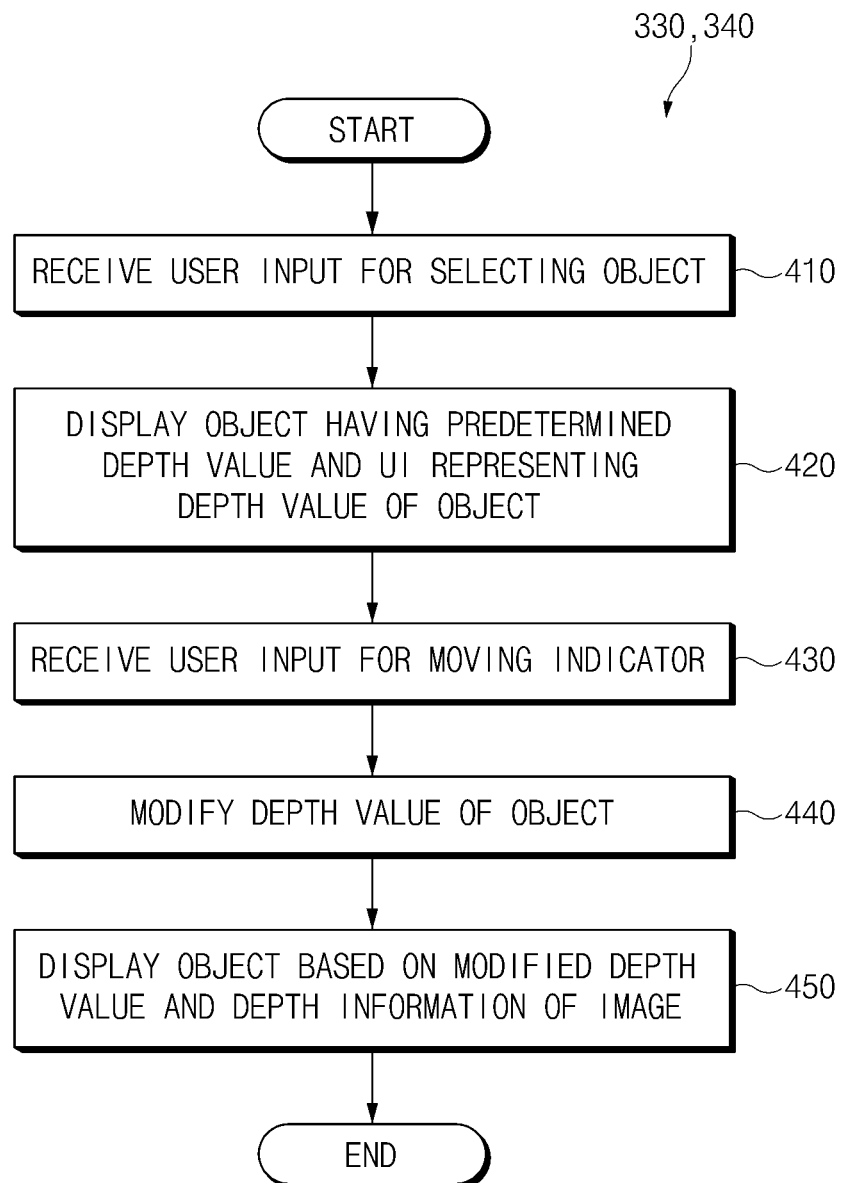
FIG. 4 is a flowchart illustrating an operation of an electronic device for editing an image using a user interface (UI) showing depth information of an image and an indicator representing a depth value of an object according to an embodiment of the disclosure.
Figure 6A:
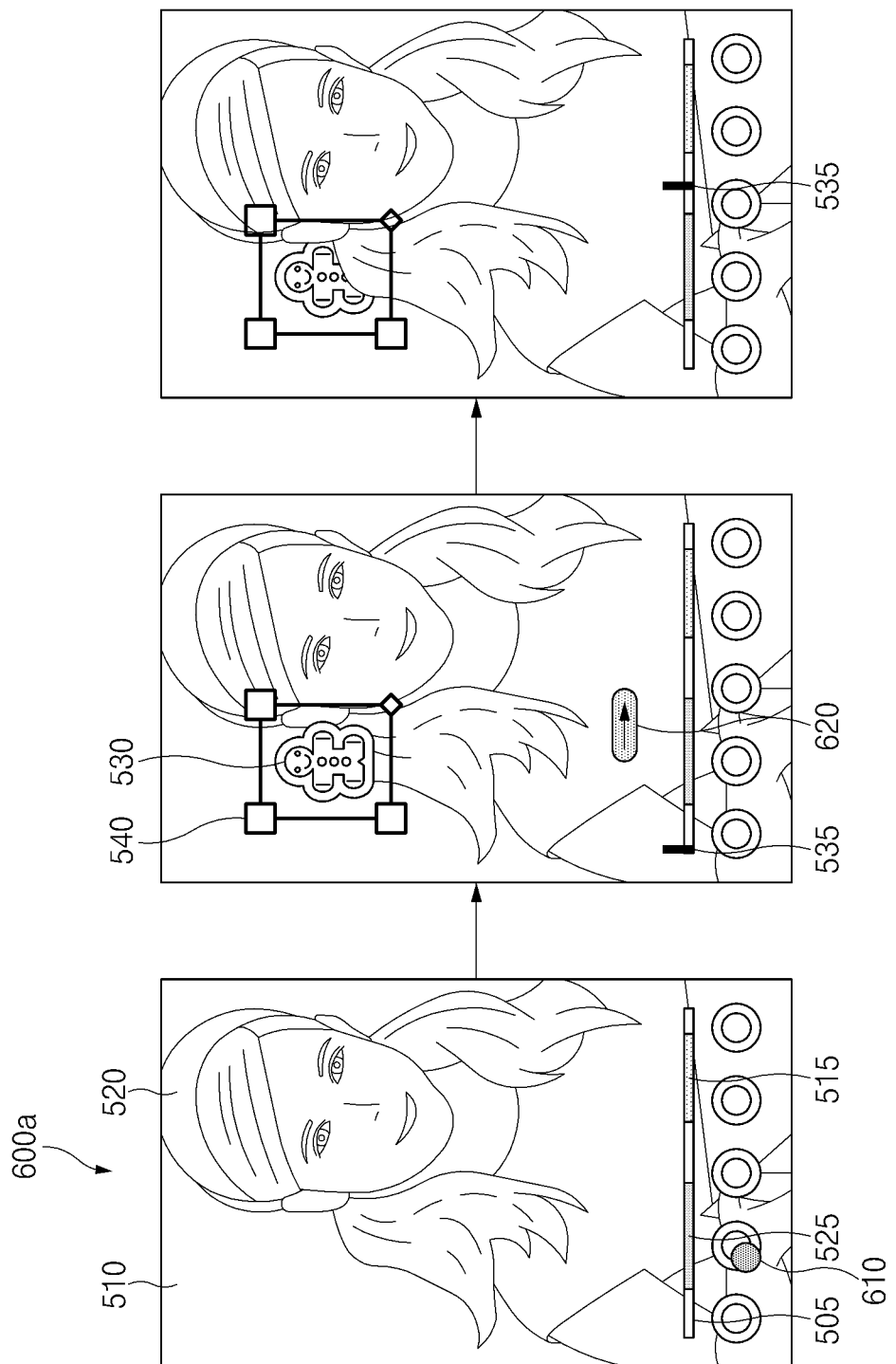
FIG. 6A is a view illustrating a sequence of operations of editing an image using a UI showing depth information of an image according to an embodiment of the disclosure.
Figure 6B:
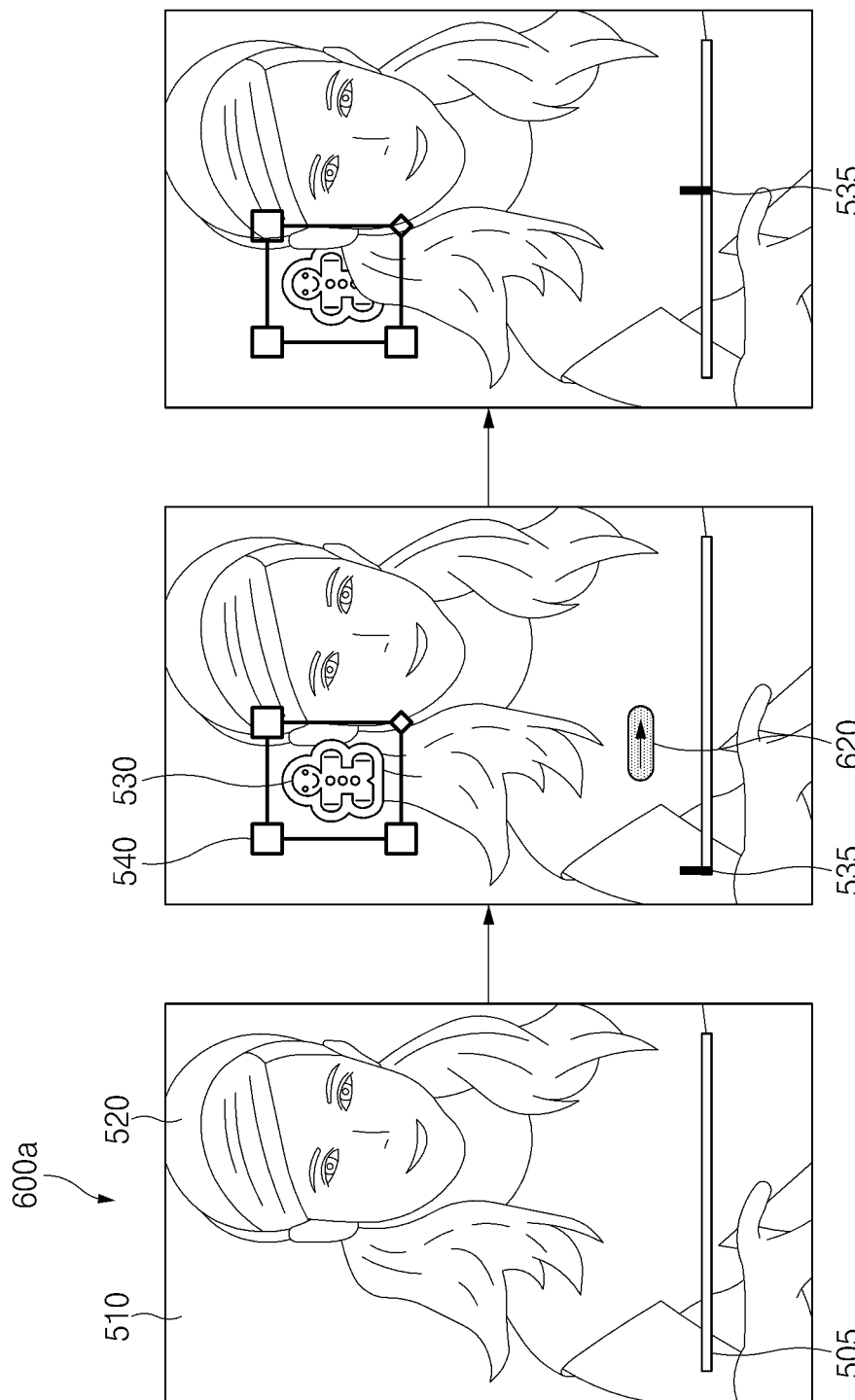
FIG. 6B is a view illustrating a sequence of operations of editing an image using another UI showing depth information of an image according to an embodiment of the disclosure.

FIGS. 4, 6A and 6B are views illustrating an operation of an electronic device for editing an image using a UI showing depth information of an image and an indicator representing a depth value of an object according to various embodiments of the disclosure. FIG. 4 may illustrate more specifically implemented operations of operations 330 and 340 of FIG. 3.

Referring to FIG. 4, in operation 410, the electronic device (e.g., the first electronic device 101, the processor 120, or the image signal processor 260) may receive a user input for selecting an object while the UI representing the image and the depth information of the image is displayed. The user input for selecting an object may include at least one of operations of selecting one of various types of objects (e.g., a sticker, a label, a drawing, a memo, an image, a mosaic, or calligraphy) and arranging the selected object in the first region.

Referring to FIG. 6A, the electronic device may display an image 600a including the background and foreground subjects 510 and 520 and the UI 505 representing the depth information of the image 600a. For example, since the depth values of the pixels constituting the background subject 510 are the same or similar to each other and the depth values of the pixels constituting the foreground subject 520 may be the same or similar to each other, the UI 505 may include the depth range 515 representing the depth information of the image region corresponding to the background subject 510 and the depth range 525 representing the depth information of the image region corresponding to the foreground subject 520. Although FIG. 6A illustrates the UI 505 in a horizontal form, which is arranged in a lower end area in the image 600a, the form and location of the UI 505 is not limited to those illustrated in FIG. 6A, and may be variously implemented depending on the implementation schemes. For example, the UI 505 may be arranged horizontally at an upper end in the image 600a, or vertically at the left or right side in the image. As another example, the UI 505 may be arranged horizontally on a lower or an upper screen than the image 600a, or vertically on the left or right screen rather than the image 600a. According to an embodiment of the disclosure, the UI 505 may be displayed in a transparent form. According to an embodiment of the disclosure, the lightness of each of the depth ranges 515 and 525 may be substantially equal to or different from each other.

In operation 420, in response to the user input for selecting an object, the electronic device may display the object having a pre-determined depth value and the indicator representing the depth value of the object. For example, the predetermined depth value may be the maximum depth value of the image. In this case, the electronic device can display the entire object in the image. The object may be seen to the user as being arranged ahead of other subjects. The electronic device may display the indicator representing the depth of the object to be arranged at the leftmost (or rightmost) position in the UI. As another example, the predetermined depth value may be the minimum depth value of the image. In this case, the electronic device may not display the object in the image. The object may be seen to the user as being arranged behind other objects. The electronic device may display the indicator representing the depth of the object to be arranged at the rightmost (or leftmost) position in the UI.

Referring to FIG. 6A, the electronic device may display an object 530 and an indicator 535 representing the depth of the object 530 in response to receiving a user input 610 for selecting an object while the image 600a is displayed. According to an embodiment of the disclosure, the electronic device may further display an indicator 540 representing the state that the object 530 is currently being edited. According to an embodiment of the disclosure, the electronic device may set a default (i.e., predetermined) depth value of the object 530 to the maximum depth value of the image 600*a*. In this case, the object 530 may be seen to the user to be arranged most forward (i.e., forward of the foreground subject 520) in the image 600*a*. The electronic device may display the indicator 535 such that the indicator 535 is arranged at the leftmost side in the UI 505. Although FIG. 6A illustrates the indicator 535 arranged at the left side in proportion to the magnitude of the depth value, the indicator 535 may be set to be arranged at the right side in proportion to the magnitude of the depth value according to an implement scheme. The color or brightness of the indicator 535 may be substantially the same as or different from the color or brightness of each of the depth ranges 515 and 525.

In operation 430, the electronic device may receive a user input for moving the displayed indicator. For example, referring to FIG. 6A, the electronic device may receive a user input 620 for moving the indicator 535. For example, the user input 620 may include a tap operation, a press operation, a pressure touch operation, a swipe operation, a flick operation, or a drag operation.

In operation 440, the electronic device may modify the depth value of the object based on the indicator moved by the user input. For example, the electronic device may increase or decrease the depth value of the object based on the direction and travel distance of the moved indicator.

In operation 450, the electronic device may display at least a part of the object in the image based on the modified depth value of the object and the depth information of the image. The electronic device may display at least a part of the object in the image by comparing the modified depth value of the object with the depth information of the region (i.e., the first region) in which the object is displayed in the image.

Referring to FIG. 6A, the electronic device may display at least a part of the object 530 having the modified depth value in response to the user input 620. Since the indicator 535 has moved to the right (i.e., the direction in which the depth value decreases), the electronic device can reduce the depth value of the object 530 based on the travel distance of the indicator 535. When the reduced depth value of the object 530 is smaller than the minimum depth value of the image area corresponding to the foreground subject 520 and greater than the maximum depth value of the image region corresponding to the background subject 510 (in other words, when the indicator 535 is arranged between the depth ranges 515 and 525 in the UI 505), the electronic device may display the object 530 except for the region which overlaps the foreground subject 520 (where the object 530 may be seen to the user as being arranged in front of the background subject 510 and behind the foreground subject 520).

According to an embodiment of the disclosure, the electronic device may provide a user experience of adjusting the depth of the object using a UI in which the depth ranges of the subjects are not represented. For example, referring to FIG. 6B, the UI 505 may not include the depth ranges 515 and 525 corresponding to the background subject 510 and the foreground subject 520, respectively. In other words, the electronic device only analyzes the color image 500*a* and the depth map 500*b* to determine the depth range 525 and the depth range 515, and does not display the determined depth ranges 515 and 525 through the display. In this case, the user of the electronic device may receive a visual effect in which the depth of the object 530 is modified using the relative position of the indicator 535 in the UI 505, without visually comparing the position of the indicator 535 with the depth ranges 515 and 525.

Figure 7:
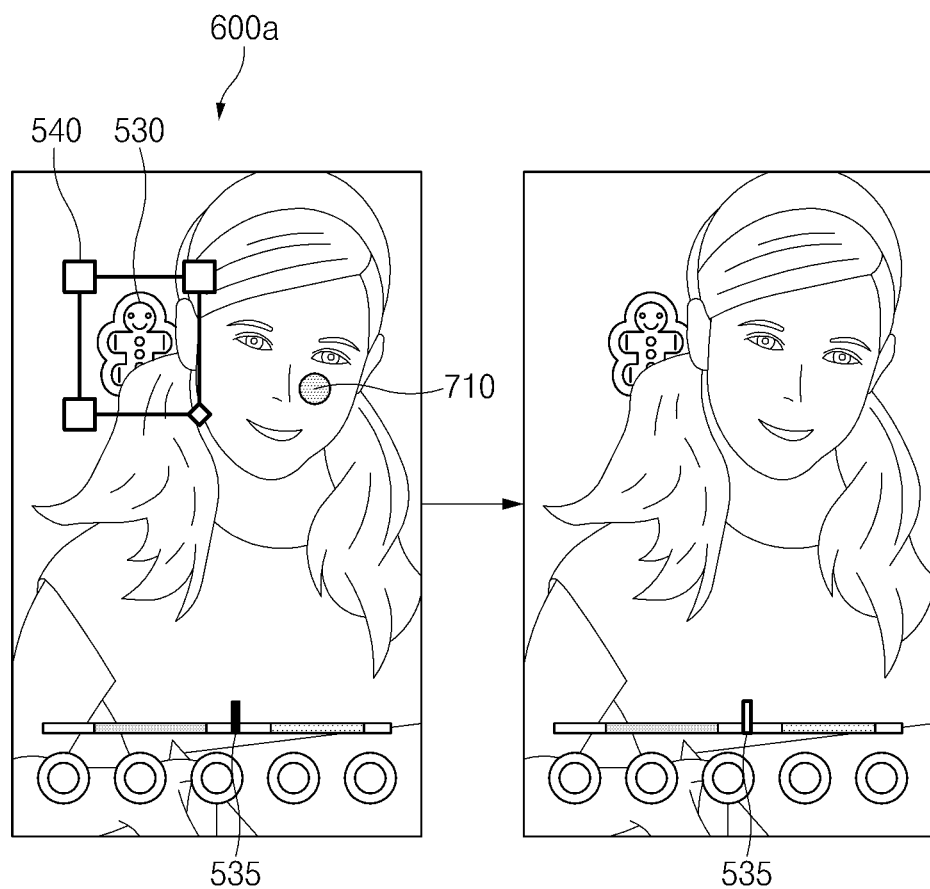
FIG. 7 is a view illustrating a sequence of operations of releasing an indicator representing the edited state of an object according to an embodiment of the disclosure.

FIG. 7 is a view illustrating a sequence of operations of releasing an indicator representing the edited state of an object according to an embodiment of the disclosure.

Referring to FIG. 7, while the object 530 and the indicator 540 representing that the object 530 is in the edit state are displayed in the image 600*a*, the electronic device may receive a user input 710 for selecting a region other than the object 530 in the image 600*a*. The user input 710 may include, for example, at least one or more tap operations.

According to an embodiment of the disclosure, in response to the user input 710, the electronic device may release the display of the indicator 540. Depending on the implement scheme, the electronic device may change the color of the indicator 535 in response to the user input 710.

Figure 8:
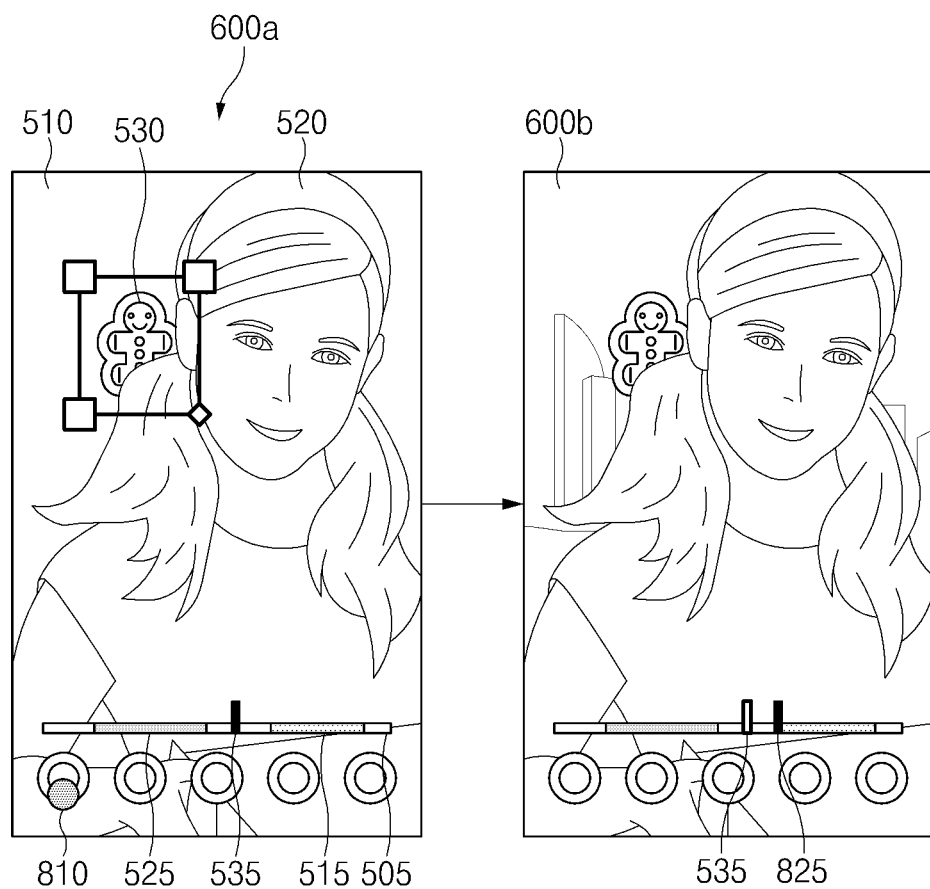
FIG. 8 is a view illustrating a sequence of operations of combining background images based on depth information of an image according to an embodiment of the disclosure.

FIG. 8 is a view illustrating a sequence of operations of combining background images based on depth information of an image according to an embodiment of the disclosure.

Referring to FIG. 8, the electronic device may receive a user input 810 for selecting a background image. Although FIG. 8 illustrates an example in which the electronic device receives the user input 810 while the object 530 is displayed, the electronic device may receive the user input 810 while the image 600*a* into which the object 530 is not inserted is displayed. For example, the user input 810 may include at least one or more tap operations.

According to an embodiment of the disclosure, in response to the user input 810, the electronic device may combine a background image 600*b* having the predetermined depth value with the image 600*a*, and display an indicator 825 representing the depth value of the background image 600*b* in the UI 505. For example, as illustrated in FIG. 8, the predetermined depth value may be smaller than the depth value of the object 530 and greater than the maximum depth value of the depth information corresponding to the depth range 515 (i.e., the indicator 825 may be arranged between the indicator 535 and the depth range 515). In this case, the electronic device may display the background image 600*b* except for the region that overlaps the object 530 and the foreground subject 520. The background image 600*b* may be seen to the user as being located behind the foreground subject 520 and the object 530.

Although not illustrated in FIG. 8, the electronic device may display the background image 600*b* of which the depth is modified, in response to the user input for moving the indicator 825. For example, when the indicator 825 is moved to the indicator 535 by the user input, the electronic device may display the background image 600*b* except for the region that overlaps the foreground subject 520. The background image 600*b* may be seen to the user as being located behind the foreground subject 520, and the object 530 may not be seen to the user.

The electronic device may provide a function of more easily combining the background image by adjusting the depth of the background image combined with the image using the UI representing the depth information and the depth value.

Figure 9:
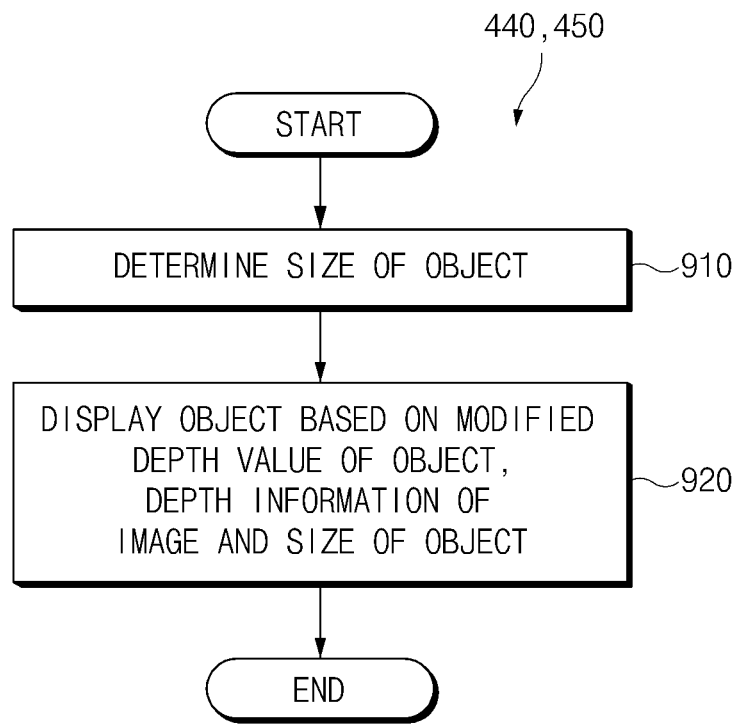
FIG. 9 is a flowchart illustrating an operation of an electronic device for editing a size of an object based on a modified depth value according to an embodiment of the disclosure.
Figure 10:
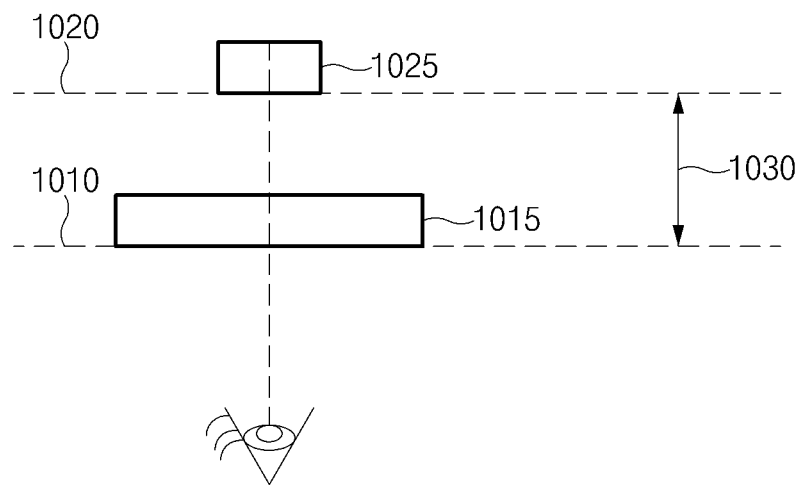
FIG. 10 is a view illustrating a principle of an operation of editing a size of an object based on a modified depth value according to an embodiment of the disclosure.
Figure 11:
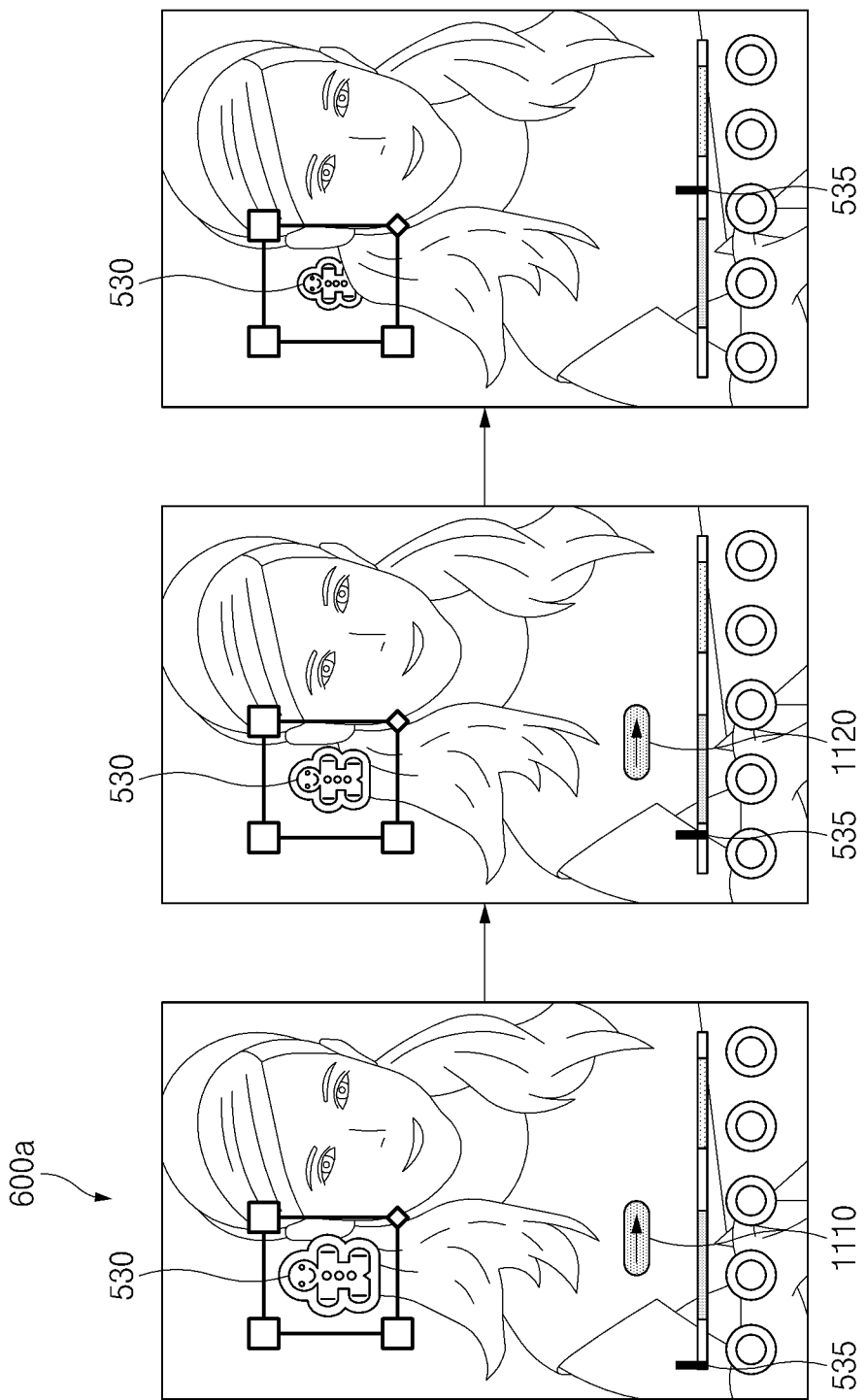
FIG. 11 is a view illustrating a sequence of operations of editing a size of an object based on a modified depth value according to an embodiment of the disclosure.

FIGS. 9 to 11 are views illustrating a sequence of operations of editing a size of an object based on a modified depth value according to various embodiments of the disclosure. The operations illustrated in FIG. 9 may be operations that more specifically implement operations 440 and 450 of FIG. 4.

Referring to FIG. 9, in operation 910, the electronic device may determine the size of the object based on the modified depth value of the object. For example, the electronic device may determine the size of the object based on the principle illustrated in FIG. 10.

Referring to FIG. 10, the distance between a depth 1010 and a user may be shorter than the distance between a depth 1020 and a user. When it is assumed that the electronic device is set to increase the depth value proportionally as the distance between the subject and the user (or the electronic device) is closer, the depth value of the depth 1010 may be greater than that of the depth 1020. The electronic device may receive the user input for modifying the depth value of an object 1015 having the depth value of the depth 1010 into the depth value of the depth 1020. The depth value of the object 1015 may be reduced by reference numeral 1030. The electronic device may modify the size (or area) of the object 1015 into the size of an object 1025 in proportion to the depth value reduced by reference numeral 1030.

In operation 920, the electronic device may display the object of which the depth and size are modified, based on the modified depth value of the object, the size of the object and the depth information of the image. For example, referring to FIG. 11, while the image 600a, the object 530, and the indicator 535 are displayed, the electronic device may receive a user input 1110 for moving the indicator 535 to the right side. For example, the user input 1110 may include a tap operation, a press operation, a pressure touch operation, a swipe operation, a flick operation, or a drag operation. In response to the user input 1110, the electronic device may display the object of which the size is reduced in proportion to the distance that the indicator 535 is moved to the right (or the reduced depth value of the object 530). In response to a user input 1120 moving the indicator 535 to the right again, the electronic device may display the object 530 of which the depth value and size are further reduced.

The electronic device may provide a visual effect in which the perspective of the object is adjusted according to the depth, by adjusting the size of the object while modifying the depth value of the object using the UI representing the depth information.

Figure 12:
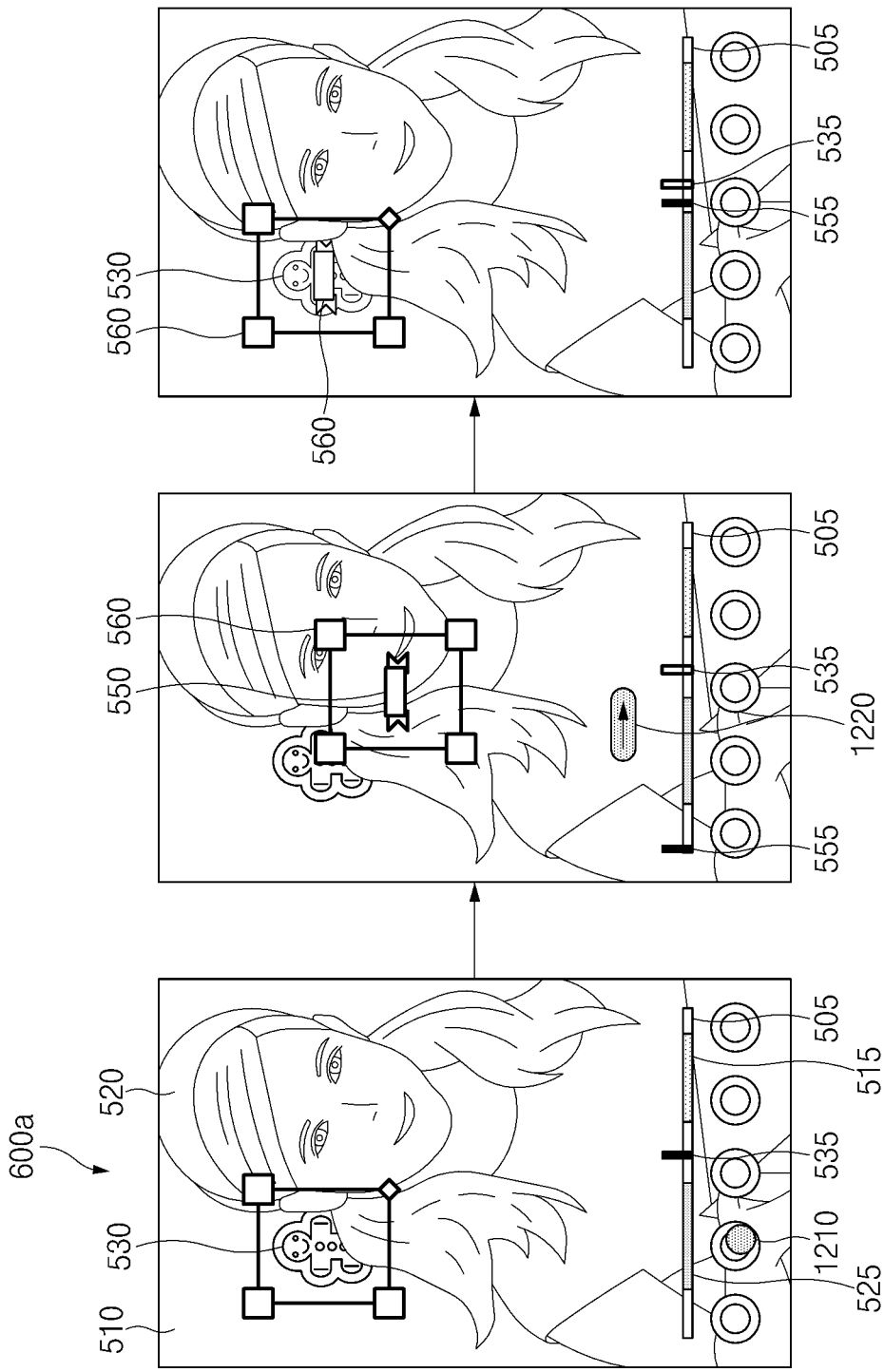
FIG. 12 is a view illustrating a sequence of operations of editing a plurality of objects in an image by using a UI representing depth information of the image according to an embodiment of the disclosure.

FIG. 12 illustrates a sequence of operations of editing a plurality of objects in an image by using a UI representing depth information of the image according to an embodiment of the disclosure.

Referring to FIG. 12, while the image 600a and the object 530 are displayed, the electronic device may receive a user input 1210 for selecting another object 550. For example, the other object 550 may include a sticker, a label, a drawing, a memo, an image, a mosaic, or calligraphy. Although an embodiment of selecting another object 550 different from the object 530 is illustrated in FIG. 12, the other object 550 may include an object of the same kind as the object 530.

According to an embodiment of the disclosure, in response to the user input 1210, the electronic device may display the other object 550 and an indicator 555 representing the depth of another object 550. According to an embodiment of the disclosure, the electronic device may display another object 550 having a predetermined depth value. For example, the predetermined depth value may be the maximum depth value of the image 600a. In this case, the electronic device may display the indicator 555 arranged at the leftmost side of the UI 505, and may display the entire another object 550 in the image 600a. The other object 550 may be seen to the user as being arranged at the front-most position in the image 600a. According to an embodiment of the disclosure, to represent that the other object 550 is currently in the edit state, the electronic device may release the display of the indicator 540 representing the edit state of the object 530 and may display an indicator 560 representing the edit state of the other object 550. According to an embodiment of the disclosure, the color or brightness of the indicator 555 may be substantially the same as or at least partially different from those of the indicator 535.

According to an embodiment of the disclosure, while the other object 550 is displayed, the electronic device may receive a user input 1220 for moving the indicator 555. In response to the user input 1220, the electronic device may display at least a part of the other object 550 of which the depth is modified. For example, since the indicator 555 is moved to the right (i.e., the direction in which the depth value is decreased), the electronic device may determine the reduced depth value of the other object 550 based on the distance that the indicator 555 moves. When the reduced depth value of the other object 550 is less than the minimum depth value of the image region corresponding to the foreground subject 520 and greater than the depth value of the object 530 (i.e., the indicator 555 is arranged between the depth range 515 and the indicator 535 in the UI 505), the electronic device may display the other object 550 except for the region which overlaps the foreground subject 520. The other object 550 may be seen to the user as being located in front of the background subject 510 and the object 530 and behind the foreground subject 520.

The electronic device may easily adjust the depth of each of a plurality of objects in an image by using a UI representing depth information. Although not illustrated in FIG. 12, the electronic device adjusts the size of the other object 550 based on the same or similar principle as that of the operations described in FIGS. 9 to 11, so that the electronic device may provide a visual effect in which the perspective of each of the plurality of objects is adjusted.

FIGS. 13 to 15B illustrate a sequence of operations of selecting a subject in an image by using a UI representing depth information of the image according to various embodiments of the disclosure. The operations illustrated in FIG. 13 may be operations that more specifically implement operation 340 of FIG. 3.

Figure 13:
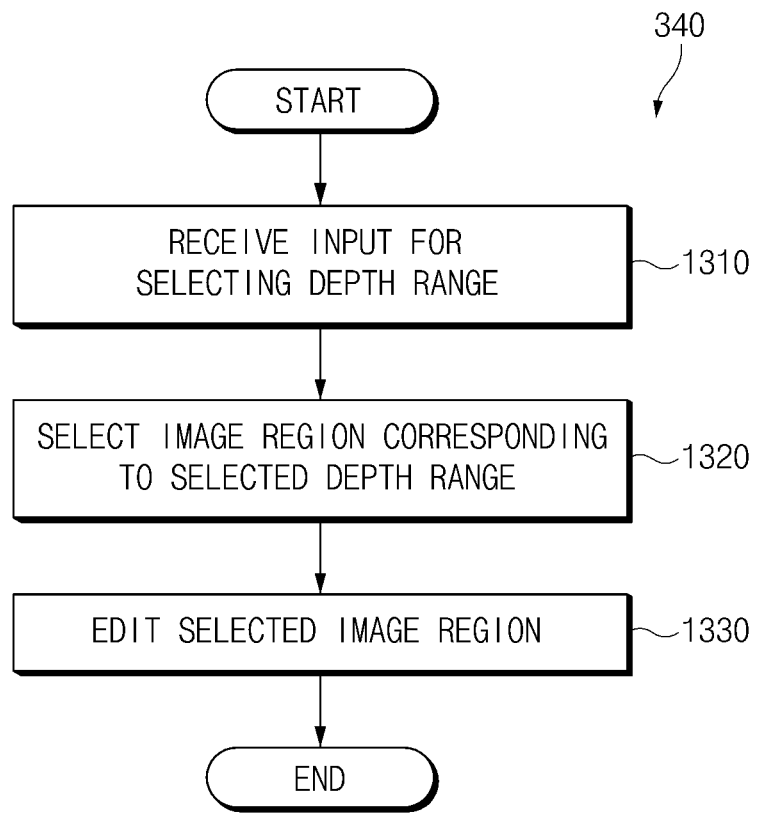
FIG. 13 is a flowchart illustrating an operation of an electronic device for selecting a subject in an image by using a UI representing depth information of the image according to an embodiment of the disclosure.

Referring to FIG. 13, in operation 1310, the electronic device (e.g., the first electronic device 101, the processor 120, or the image signal processor 260) may receive an input for selecting a depth range.

Figure 14:
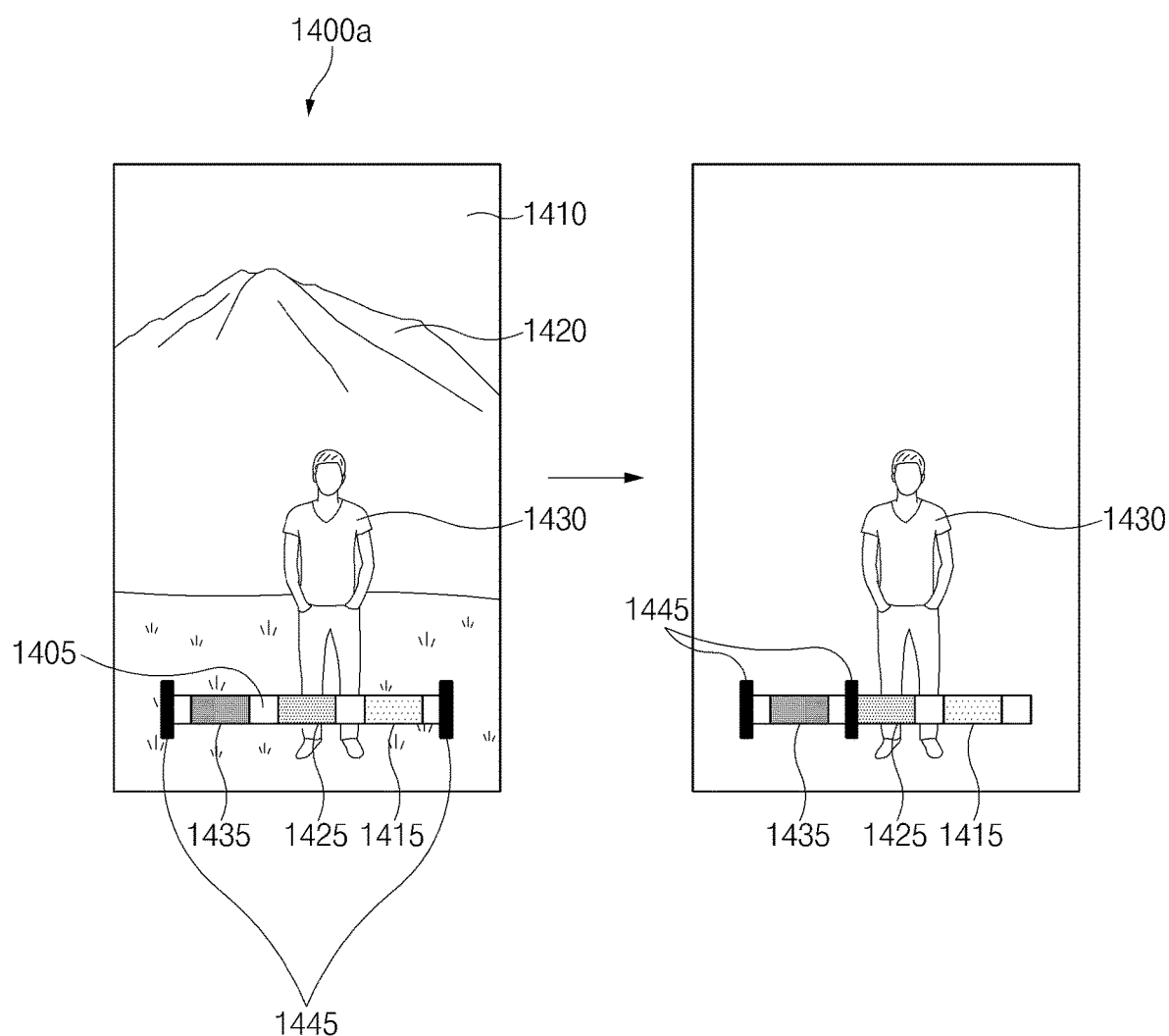
FIG. 14 is a flowchart illustrating a sequence of operations of selecting a subject in an image by using a UI representing depth information of the image according to an embodiment of the disclosure.

Referring to FIG. 14, the electronic device may display an image 1400a and a UI 1405 representing depth information of the image 1400a. The image 1400a may include background subjects 1410 and 1420, and a foreground subject 1430. The UI 1405 may include a depth range 1415 representing depth information of the image region corresponding to the background subject 1410, a depth range 1425 representing depth information of the image region corresponding to the background subject 1420, and a depth range 1435 representing depth information of the image region corresponding to the foreground subject 1430. The colors or brightness of the depth ranges 1415, 1425 and 1435 may substantially be the same as, or at least partially different from each other based on the depth information. The electronic device may receive a user input for moving an indicator 1445 for selecting a depth range. For example, as illustrated in FIG. 14, the electronic device may receive the user input for moving the indicator 1445 such that the indicator 1445 indicates the depth range 1435. Although an embodiment of selecting a depth range using two indicators is illustrated in FIG. 14, various embodiments for selecting a depth range may be provided. For example, the user input for selecting a depth range may include at least one or more tap operations, press operations, pressure touch operations, pinch-in operations, pinch-out operations, button operations, or combinations thereof using a user's body (e.g., a finger) or an external device (e.g., a touch pen).

In operation 1320, in response to the user input for selecting a depth range, the electronic device may select an image region corresponding to the depth range selected in the image. For example, referring to FIG. 14, in response to the user input for moving the indicator 1445 indicating the depth range 1435, the electronic device may select the image area (e.g., the image region corresponding to the foreground subject 1430 in the image 1400a) corresponding the depth range 1435.

In operation 1330, the electronic device may edit the selected image region. According to an embodiment of the disclosure, the electronic device may copy or remove the selected image region. For example, referring to FIG. 14, the electronic device may remove another image region except for the image region corresponding to the foreground subject 1430 from the image 1400a. As another example, although not illustrated in FIG. 14, the electronic device may remove only the image region corresponding to the foreground subject 1430 from the image 1400a.

According to an embodiment of the disclosure, the electronic device may combine the selected image region with another image.

Figure 15A:
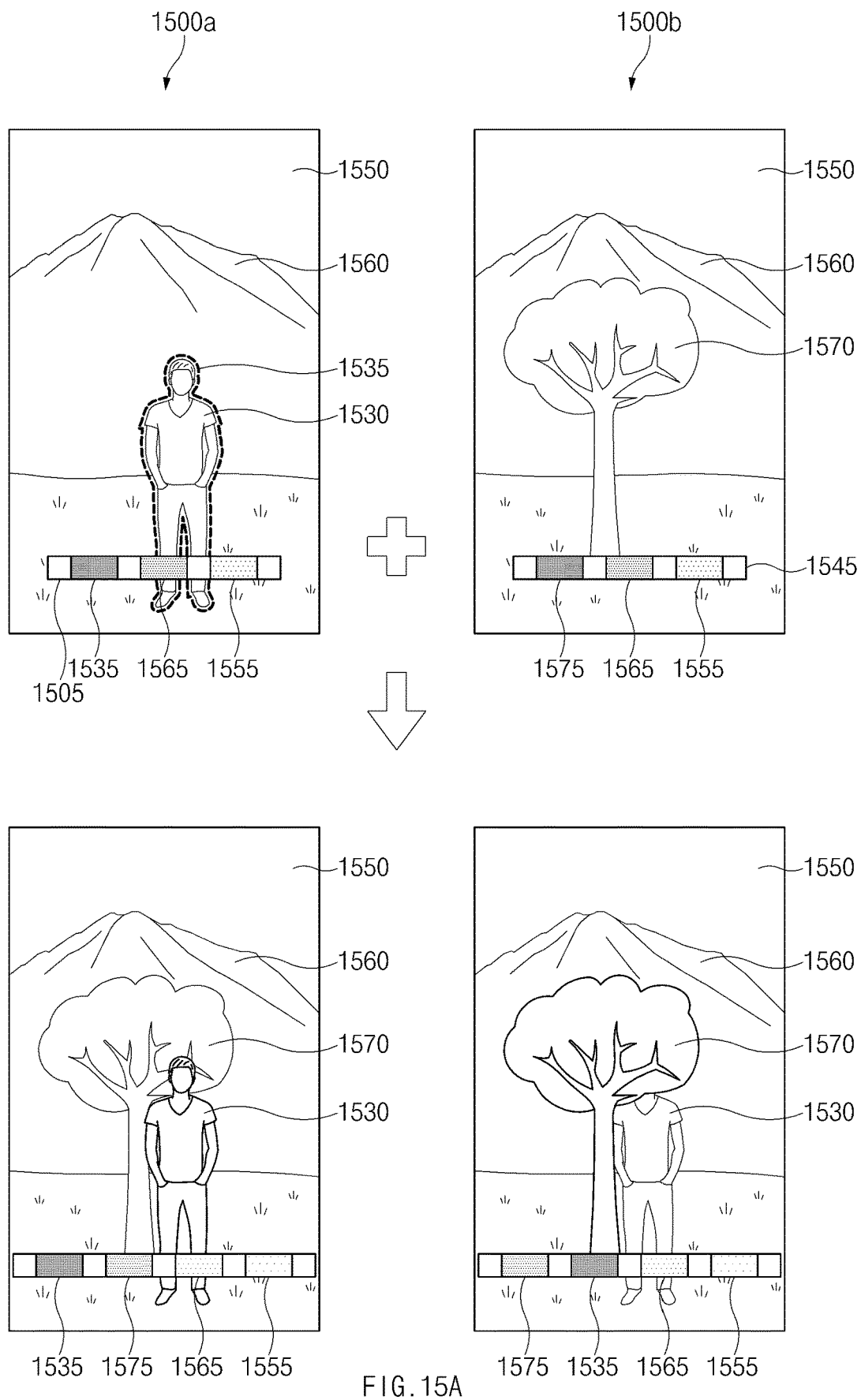
FIG. 15A is a view illustrating an image composition using a UI representing depth information of an image according to an embodiment of the disclosure.

FIG. 15A is a view illustrating an image composition using a UI representing depth information of an image according to an embodiment of the disclosure.

Referring to FIG. 15A, while an image 1500a and a UI 1505 are displayed, the electronic device may receive a user input for selecting a depth range 1535 in the UI 1505 and may select the image region (i.e., the image region corresponding to the foreground subject 1530) corresponding to the selected depth range 1535. The electronic device may combine the selected image region with an image 1500b. The image 1500b may include background subjects 1550 and 1560, and a foreground subject 1570. A UI 1545 representing the depth information of the image 1500b may include a depth range 1555 representing depth information of an image region corresponding to the background subject 1550, a depth range 1565 representing depth information of an image region corresponding to the background subject 1560, and a depth range 1575 representing depth information of an image region corresponding to the foreground subject 1570. According to an embodiment of the disclosure, the electronic device may combine the image region corresponding to the foreground subject 1530 with the image 1500b and may display the depth range 1535 of the combined image region in the UI 1545. According to an embodiment of the disclosure, in response to the user input for moving the depth range 1535, the electronic device may display the depth range 1535 of which the location is changed and at least a part of the image region corresponding to the foreground subject 1530 of which the depth is modified.

Figure 15B:
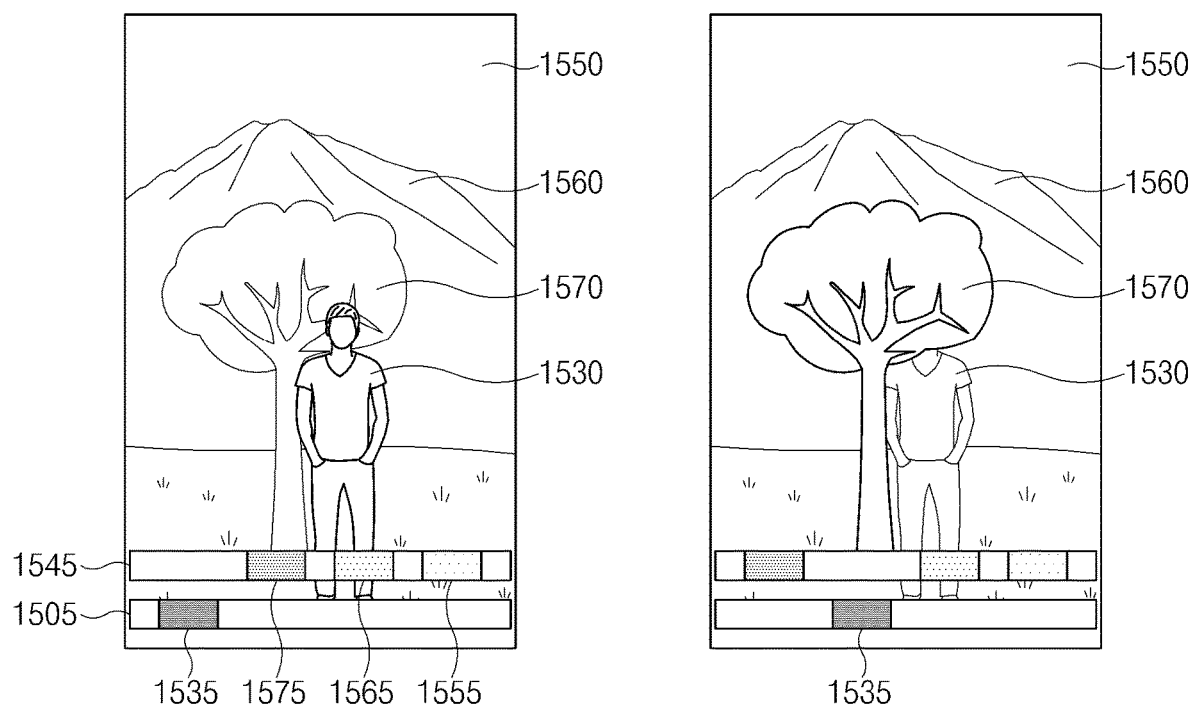
FIG. 15B is a view illustrating an image composition using a UI representing depth information of an image according to an embodiment of the disclosure.

Although an embodiment in which the depth range 1535 is added into the UI 1545 is illustrated in FIG. 15A, the electronic device may display the additional UI. Referring to FIG. 15B, the electronic device may display the UIs 1545 and 1505. Although an example of arranging the UIs 1545 and 1505 are arranged in the image 1500b is illustrated in FIG. 15B, the locations and forms of the UIs 1545 and 1505 are not limited to those of FIG. 15B. For example, the UIs 1545 and 1505 may be arranged on the screen below the image 1500b. As another example, at least one of the UIs 1545 and 1505 may be displayed in a transparent form. As still another example, the UI 1505 may be arranged on a top end of the UI 1545.

The electronic device may provide functions of more easily selecting and editing an image by selecting a specific image region in the image using a UI representing a depth range.

Figure 16:
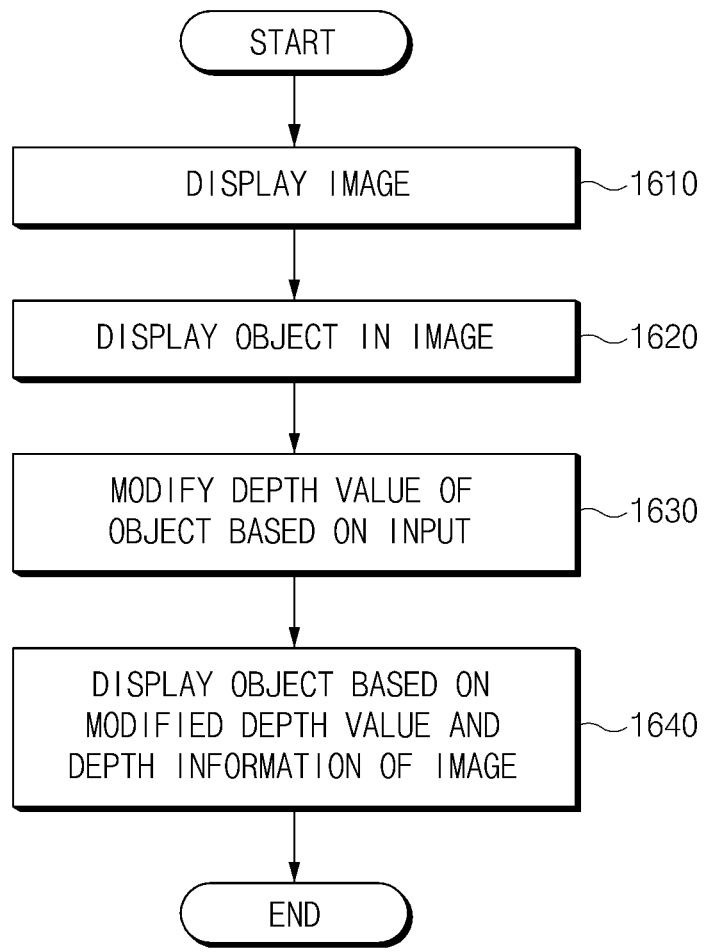
FIG. 16 is a flowchart illustrating an electronic device for displaying an object of which a depth value is modified based on a user input according to an embodiment of the disclosure.

FIG. 16 is a flowchart illustrating an electronic device for displaying an object of which a depth value is modified based on a user input according to an embodiment of the disclosure.

Referring to FIG. 16, in operation 1610, the electronic device (e.g., the first electronic device 101, the processor 120, or the image signal processor 260) may display an image including at least one subject through the display device (e.g., the display device 160). For example, the image may include an image captured through the camera sensor of the electronic device or a preview image.

In operation 1620, the electronic device may display the object within the displayed image. The object may include, for example, a sticker, a label, a drawing, a memo, an image, a mosaic, or calligraphy. For example, an electronic device may display an object in response to receiving a user input for inserting an object in the image.

In operation 1630, the electronic device may modify the depth value of the object based on the received user input. The user input may include various types of user inputs for modifying the depth of the displayed object. For example, the user input may include a tap operation, a press operation, a pressure touch operation, a hovering operation, a panning operation, a swipe operation, a flick operation, a hovering operation, a button input operation, a drag operation, or a combination thereof, using a user's body or an external device.

In operation 1640, the electronic device may display at least a part of the object of which the depth is modified in response to receiving the user input.

Figure 17A:
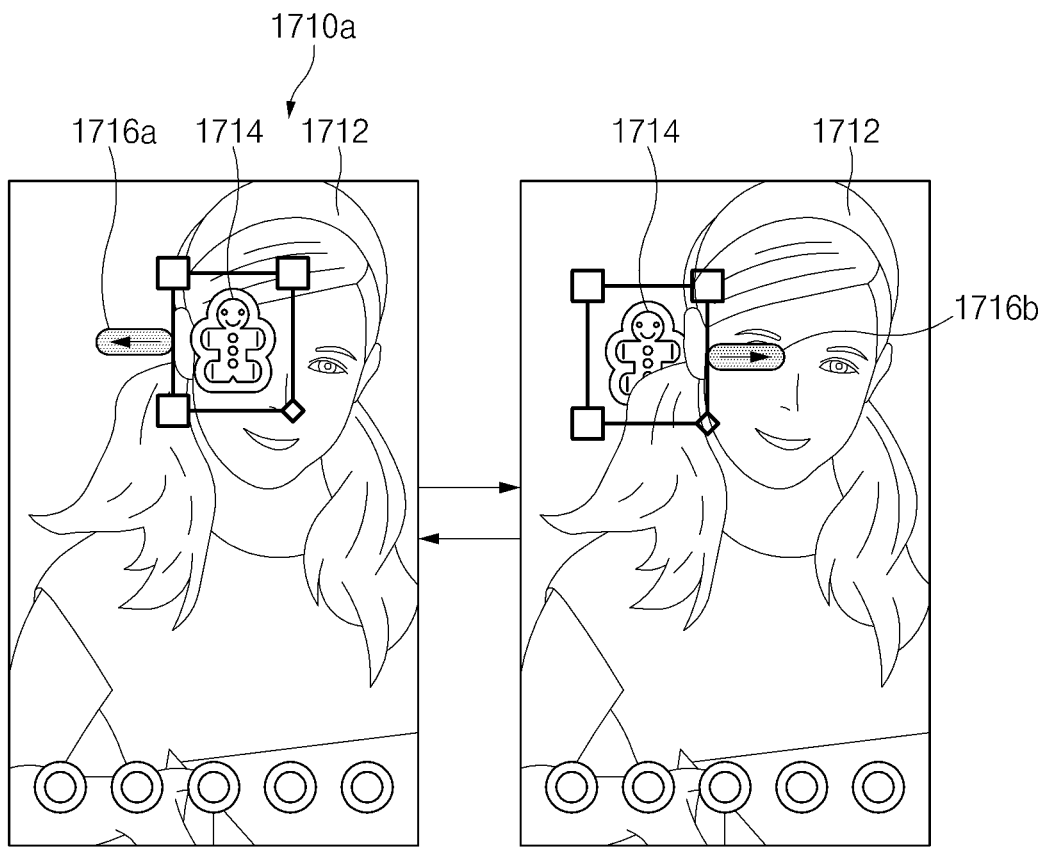
FIGS. 17A, 17B, and 17C are views illustrating a sequence of operations of displaying an object of which a depth value is modified based on a user input according to various embodiments of the disclosure.
Figure 17B:
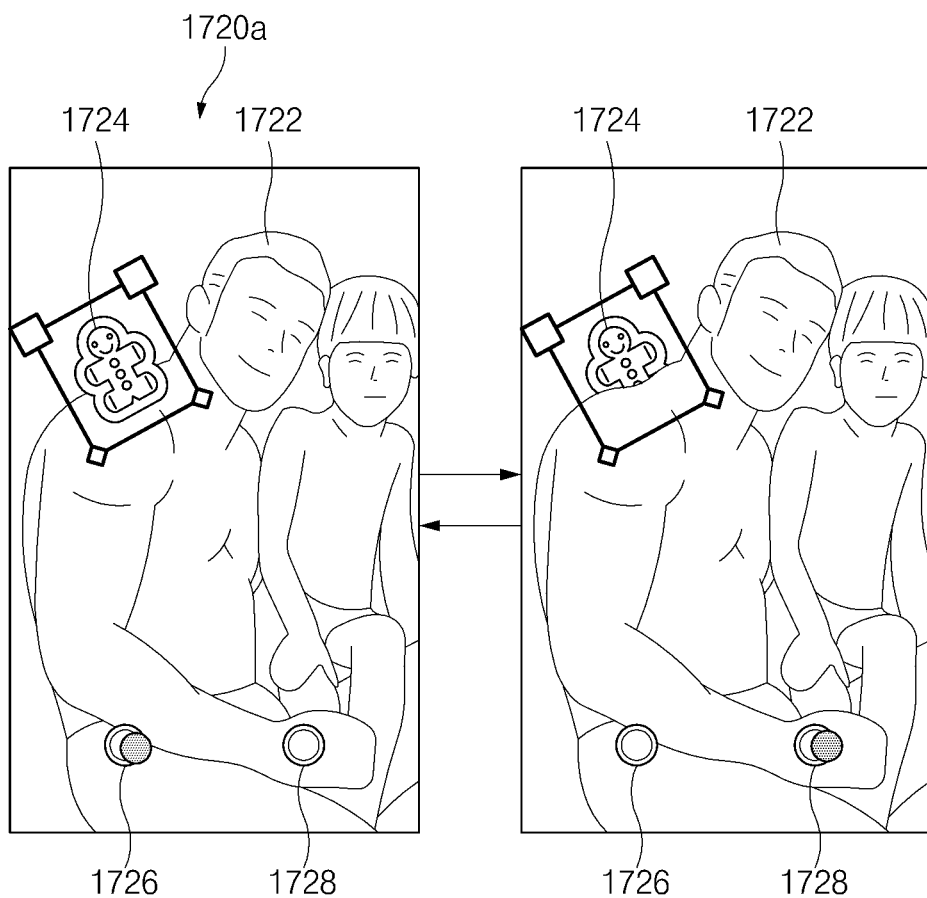
Figure 17C:
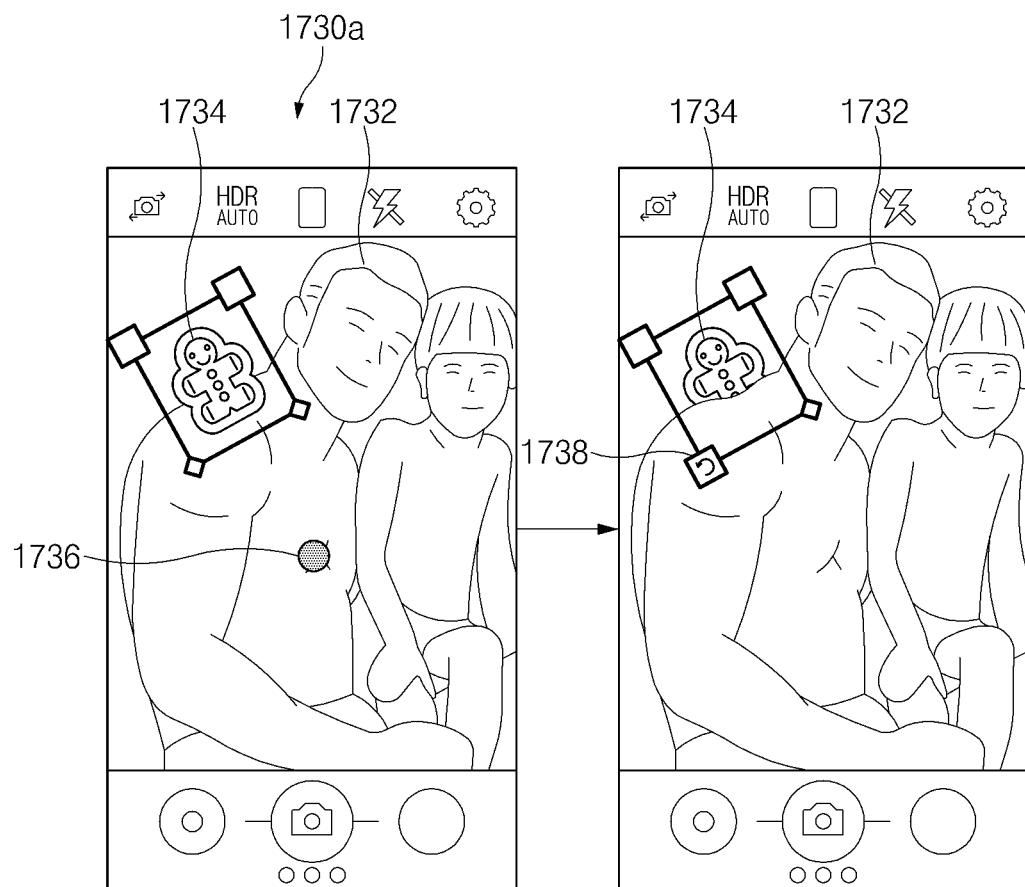

FIGS. 17A to 17C are views illustrating a sequence of operations of displaying an object of which a depth value is modified based on a user input according to various embodiments of the disclosure.

According to an embodiment of the disclosure, the electronic device may modify the depth value of the object based on the depth information or the color information of the region where the object moved based on the user input for moving the object is located.

Referring to FIG. 17A, while an image 1710a into which an object 1714 is inserted is displayed, the electronic device may receive a user input 1716a or 1716b (e.g., a swipe action, a panning operation, a drag operation, or a flick operation) for moving the object 1714 in a specific direction. In response to the user input 1716a, the electronic device may change the depth value of object 1714 based on the depth or color information of the region in which the moved object 1714 is located. For example, when the depth values or RGB values of a certain number or more of pixels among pixels in the region in which the moved object 1714 is located are the same as or similar to those of the pixels constituting a subject 1712, the electronic device may display the entire object 1714 in the image 1710a. The object 1714 may be seen to the user as being arranged in front of the subject 1712. As another example, when the depth values or RGB values of a certain number or more of pixels among pixels in the region in which the moved object 1714 is located are the same as or similar to those of the pixels constituting a background subject, the electronic device may display the object 1714 except for the region that overlaps the subject 1712 in the image 1710a. The object 1714 may be seen to the user as being arranged behind the subject 1712.

According to an embodiment of the disclosure, the electronic device may modify the depth value of the object in response to a user input for modifying the depth value of the object by operating a button. Referring to FIG. 17B, while an image 1720a in which an object 1724 is arranged in front of a subject 1722 is displayed, the electronic device may receive a user input for selecting a button 1726 to reduce the depth value of the object 1724. The electronic device may modify the depth value of the object 1724 to be less than the minimum depth value of the image region corresponding to the subject 1722 in response to a user input for selecting the button 1726. As another example, while the object 1724 is displayed behind the subject 1722, in response to a user input for selecting a button 1728 to increase the depth value of the object 1724, the electronic device may modify the depth value of the object 1724 to be greater than the maximum depth value of the image region corresponding to the subject 1722.

According to another embodiment of the disclosure, the electronic device may modify the depth value of the object in a preview image. Referring to FIG. 17C, while a preview image 1730a is displayed, the electronic device may receive a user input 1736 for auto-focusing a subject 1732. The electronic device may increase the depth value of the subject 1732 or decrease the depth value of an object 1734 in response to the user input 1736. While the object 1734 is displayed behind the subject 1732, the electronic device may increase the depth value of the subject 1732 in response to the user input for selecting a button 1738.

The electronic device may provide convenience to the user by displaying an object having a modified depth value in response to various user inputs in addition to a scheme using a UI representing depth information.

As described above, the electronic device (e.g., the first electronic device 101) disclosed in the disclosure may include a display unit (e.g., the display device 160), a memory (e.g., the memory 130) for storing instructions, and a processor (e.g., the processor 120 or the image signal processor 260), where the processor may execute the stored instructions to display the image and a user interface (e.g., the UI 505) representing the depth information of the image through the display unit in response to a first user input for editing the image (e.g., the image 600a), receive a second user input for selecting an object (e.g., the object 530) to be added in the image, display at least a part of the object in the image based on a depth value of the object and depth information of a first region in which the object is located in the image, and display an indicator (e.g., the indicator 535) representing the depth value of the object in the UI. According to an embodiment of the disclosure, the UI may be displayed in the image or on a lower end of the image.

According to an embodiment of the disclosure, the processor may execute the stored instructions to display the object having a predetermined depth value in the first region in response to the second user input, modify the predetermined depth value of the object in response to a third user input (e.g., the user input 620) for moving the indicator, and display at least a part of the object in the image based on the modified depth value of the object and the depth information of the first region.

According to an embodiment of the disclosure, the processor may execute the stored instructions to determine a size of the object based on the modified depth value of the object, and display at least a part of the object in the image based on the modified depth value of the object, the depth information of the first region and the size of the object.

According to an embodiment of the disclosure, the processor may execute the stored instructions to receive a fourth user input (e.g., the background image 600b) for selecting a background image to be added in the image, and display at least a part of the background image in the image based on a depth value of the background image and the depth information of the image.

According to an embodiment of the disclosure, the processor may execute the stored instructions to receive a fifth user input for selecting a depth range in the UI, and display a second region corresponding to the selected depth range in the image. In addition, the processor may execute the stored instructions to combine an image of the second region with another image.

According to an embodiment of the disclosure, the processor may execute the stored instructions to display a second indicator (e.g., the indicator 540) representing an edited state of the object in response to the second user input, and release the display of the second indicator in response to a sixth user input (e.g., the user input 710) for selecting a region except the first region in the image.

As described above, a method of an electronic device disclosed in the disclosure may include an operation of displaying an image (e.g., the image 600a) a user interface (e.g., the UI 505) representing and depth information of the image in response to a first user input for editing the image, an operation of receiving a second user input for selecting an object (e.g., the object 530) to be added in the image, an operation of displaying at least a part of the object in the image based on a depth value of the object and depth information of a first region in which the object is located in the image, and an operation of displaying an indicator (e.g., the indicator 535) representing the depth value of the object in the UI.

According to an embodiment of the disclosure, the method may further include an operation of displaying the object having a predetermined depth value in the first region in response to the second user input, an operation of modifying the predetermined depth value of the object in response to a third user input (e.g., the user input 620) for moving the indicator, and an operation of displaying at least a part of the object in the image based on the modified depth value of the object and the depth information of the first region.

According to an embodiment of the disclosure, the method may further include an operation of determining a size of the object based on the modified depth value of the object, and an operation of displaying at least a part of the object in the image based on the modified depth value of the object, the depth information of the first region and the size of the object.

According to an embodiment of the disclosure, the method may further include an operation of receiving a fourth user input for selecting a background image (e.g., the background image 600b) to be added in the image, and an operation of displaying at least a part of the background image in the image based on a depth value of the background image and the depth information of the image.

According to an embodiment of the disclosure, the method may further include an operation of receiving a fifth user input for selecting a depth range in the UI, and an operation of displaying a second region corresponding to the selected depth range in the image. In addition, the method may further include an operation of combining an image of the second region with another image.

According to an embodiment of the disclosure, the method may further include an operation of displaying a second indicator representing an edited state of the object in response to the second user input, and an operation of releasing the display of the second indicator in response to a sixth user input for selecting a region except the first region in the image.

As described above, the electronic device (e.g., the first electronic device 101) disclosed in the disclosure may include at least one image sensor (e.g., the camera module 188 or the image sensor 230), a display unit (e.g., the display device 160), a memory (e.g., the memory 130) for storing instructions, and a processor (e.g., the processor or the image signal processor 260), where the processor may execute the stored instructions to obtain a color image (e.g., the color image 500a) and a depth map (e.g., the depth map 500b) corresponding to the color image through the at least one image sensor, generate an image (e.g., the image 600a) by combining the color image with the depth map, display the image and a user interface (e.g., the UI 505) representing depth information of the image through the display unit in response to a first user input for editing the image, receive a second user input for selecting an object (e.g., the object 530) to be added in the image, display at least a part of the object in the image based on a depth value of the object and depth information of a first region in which the object is located in the image, and display an indicator (e.g., the indicator 535) representing the depth value of the object in the UI.

According to an embodiment of the disclosure, the processor may execute the stored instructions to display the object having a predetermined depth value in the first region in response to the second user input, modify the predetermined depth value of the object in response to a third user input (e.g., the user input 620) for moving the indicator, and display at least a part of the object in the image based on the modified depth value of the object and the depth information of the first region.

According to an embodiment of the disclosure, the processor may execute the stored instructions to determine a size of the object based on the modified depth value of the object, and display at least a part of the object in the image based on the modified depth value of the object, the depth information of the first region and the size of the object.

According to an embodiment of the disclosure, the processor may execute the stored instructions to receive a fourth user input for selecting a background image (e.g., the background image 600b) to be added in the image, and display at least a part of the background image in the image based on a depth value of the background image and the depth information of the image.

According to an embodiment of the disclosure, the processor may execute the stored instructions to receive a fifth user input for selecting a depth range in the UI, and display a second region corresponding to the selected depth range in the image.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the first electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment of the disclosure, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium, such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding component prior to the integration. Operations performed by a module, a programming, or other components according to various embodiments of the disclosure may be executed sequentially, in parallel, repeatedly, or in a heuristic method. In addition, at least some operations may be executed in different sequences, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one image sensor;
   a display;
   a processor; and
   a memory configured to store instructions,
   wherein the instructions, when executed by the processor, cause the processor to:
      obtain, via the at least one image sensor, a color image and a depth map corresponding to the color image,
      generate an image by combining the color image with the depth map,
      control the display to display the image,
      while displaying the image, receive a first user input selecting an object to be added to the image, and
      in response to receiving the first user input, control the display to display at least a part of the object in the image, based on a depth value of the object and depth information of a first region in which the object is located in the image, and
   wherein the depth information of the image is determined based on the depth map before receiving the first user input.

2. The electronic device of claim 1, wherein the instructions further cause the processor to:
   in response to receiving the first user input, control the display to display a user interface (UI) representing the depth information of the image, and control the display to display a first indicator representing the depth value of the object in the UI.

3. The electronic device of claim 2, wherein the instructions further cause the processor to:
   in response to receiving the first user input, control the display to display the object having a predetermined depth value in the first region,
   in response to receiving a second user input for moving the first indicator, modify the predetermined depth value of the object, and
   control the display to display the part of the object in the image based on the modified depth value of the object and the depth information of the first region.

4. The electronic device of claim 3, wherein the instructions further cause the processor to:
   determine a size of the object based on the modified depth value of the object, and
   control the display to display the part of the object in the image based on the modified depth value of the object, the depth information of the first region, and the size of the object.

5. The electronic device of claim 2, wherein the instructions further cause the processor to:
   receive a fourth user input selecting a depth range in the UI, and
   control the display to display a second region corresponding to the selected depth range in the image.

6. The electronic device of claim 4, wherein the instructions further cause the processor to combine an image of the second region with another image.

7. The electronic device of claim 1, wherein the instructions further cause the processor to:
   receive a third user input selecting a background image to be added to the image, and
   control the display to display at least a part of the background image in the image based on a depth value of the background image and the depth information of the image.

8. The electronic device of claim 1, wherein the instructions further cause the processor to:
   in response to receiving the first user input, control the display to display a second indicator representing an edited state of the object, and
   in response to receiving a fifth user input selecting a region except the first region in the image, release the display of the second indicator.

9. A method of an electronic device, the method comprising:
   obtaining, via at least one image sensor, a color image and a depth map corresponding to the color image;
   generating an image by combining the color image with the depth map;
   displaying the image on a display of the electronic device;
   while displaying the image, receiving a first user input selecting an object to be added to the image; and
   in response to receiving the first user input, displaying at least a part of the object in the image, based on a depth value of the object and depth information of a first region in which the object is located in the image,
   wherein the depth information of the image is determined based on the depth map before receiving the first user input.

10. The method of claim 9, further comprising:
    in response to receiving the first user input, displaying a user interface (UI) representing the depth information of the image, and displaying a first indicator representing the depth value of the object in the UI.

11. The method of claim 10, further comprising:
    in response to receiving the first user input, displaying the object having a predetermined depth value in the first region;
    in response to receiving a second user input for moving the first indicator, modifying the predetermined depth value of the object; and
    displaying the part of the object in the image based on the modified depth value of the object and the depth information of the first region.

12. The method of claim 11, further comprising:
    determining a size of the object based on the modified depth value of the object; and
    displaying the part of the object in the image based on the modified depth value of the object, the depth information of the first region, and the size of the object.

13. The method of claim 10, further comprising:
    receiving a fourth user input selecting a depth range in the UI; and
    displaying a second region corresponding to the selected depth range in the image.

14. The method of claim 13, further comprising combining an image of the second region with another image.

15. The method of claim 9, further comprising:
receiving a third user input selecting a background image to be added to the image; and
displaying at least a part of the background image in the image based on a depth value of the background image and the depth information of the image.

16. The method of claim 9, further comprising:
in response to receiving the first user input, displaying a second indicator representing an edited state of the object; and
in response to receiving a fifth user input selecting a region except the first region in the image, releasing the display of the second indicator.

* * * * *